(12) United States Patent
Söllner et al.

(10) Patent No.: US 9,442,209 B2
(45) Date of Patent: Sep. 13, 2016

(54) METHODS AND SYSTEMS FOR RECONSTRUCTION OF LOW FREQUENCY PARTICLE VELOCITY WAVEFIELDS AND DEGHOSTING OF SEISMIC STREAMER DATA

(75) Inventors: Walter Söllner, Oslo (NO); Okwudili Orji, Oslo (NO); Stian Hegna, Lysaker (NO)

(73) Assignee: PGS GEOPHYSICAL AS, Oslo (NO)

(*) Notice: Subject to any disclaimer, the term of this patent is extended or adjusted under 35 U.S.C. 154(b) by 993 days.

(21) Appl. No.: 13/545,609

(22) Filed: Jul. 10, 2012

(65) Prior Publication Data

US 2014/0016436 A1 Jan. 16, 2014

(51) Int. Cl.
*G01V 1/38* (2006.01)
*G01V 1/36* (2006.01)

(52) U.S. Cl.
CPC ........... *G01V 1/364* (2013.01); *G01V 2210/56* (2013.01)

(58) Field of Classification Search
CPC ..................... G01V 1/364; G01V 2210/56
USPC .......................................................... 367/24
See application file for complete search history.

(56) References Cited

U.S. PATENT DOCUMENTS

| | | | |
|---|---|---|---|
| 4,752,916 A * | 6/1988 | Loewenthal | 367/24 |
| 6,529,445 B1 * | 3/2003 | Laws | G01V 1/364 367/151 |
| 6,654,693 B2 * | 11/2003 | Sen et al. | 702/17 |
| 6,661,346 B1 * | 12/2003 | Wood et al. | 340/601 |
| 7,359,283 B2 * | 4/2008 | Vaage | G01V 1/3808 367/15 |
| 7,835,224 B2 * | 11/2010 | Robertsson | B63B 21/56 367/20 |
| 7,872,942 B2 | 1/2011 | Sollner | |
| 8,634,271 B2 * | 1/2014 | Sablon | 367/24 |
| 8,902,699 B2 * | 12/2014 | Sollner et al. | 367/22 |
| 9,229,123 B2 * | 1/2016 | Pan | G01V 1/36 |
| 2004/0223411 A1 * | 11/2004 | Vossen | G01V 1/28 367/38 |
| 2005/0013194 A1 * | 1/2005 | Vaage et al. | 367/24 |
| 2005/0073909 A1 | 4/2005 | Laws et al. | |
| 2005/0195686 A1 | 9/2005 | Vaage et al. | |
| 2006/0074562 A1 * | 4/2006 | Amundsen et al. | 702/18 |
| 2008/0186804 A1 | 8/2008 | Amundsen et al. | |
| 2009/0016158 A1 * | 1/2009 | Gratacos | 367/21 |
| 2009/0281732 A1 | 11/2009 | Turnbull | |
| 2012/0026830 A1 * | 2/2012 | Wang | G01V 1/364 367/24 |
| 2012/0082001 A1 * | 4/2012 | Welker et al. | 367/24 |
| 2013/0028049 A1 | 1/2013 | Pan | |
| 2013/0077436 A1 * | 3/2013 | Soubaras | 367/24 |

(Continued)

OTHER PUBLICATIONS

Holford, R.L., "Scattering of sound waves at a periodic, pressure-release surface: An exact solution", J. Acoust. Soc. Am. 704(4), Oct. 1981, pp. 1116-1128.

(Continued)

*Primary Examiner* — Daniel L Murphy

(57) ABSTRACT

Computational methods and systems for deghosting marine seismic streamer data are described. In particular, an exploration-seismology vessel tows a number of streamers that form a data acquisition surface located beneath a free surface. The methods computationally deghost or substantially remove receiver ghost signals from seismic data recorded by steamer receivers. The deghosting methods include low frequency compensation to recover vertical velocity wavefield information that is typically lost due to a low signal-to-noise ratio over a low frequency range independent of the free surface conditions or the shape of the data acquisition surface.

20 Claims, 22 Drawing Sheets

(56) References Cited

U.S. PATENT DOCUMENTS

| | | | |
|---|---|---|---|
| 2013/0282292 A1* | 10/2013 | Wang | G01V 1/364 702/17 |
| 2014/0200820 A1* | 7/2014 | El Yadari et al. | 702/17 |
| 2014/0379266 A1* | 12/2014 | Jiao et al. | 702/17 |
| 2015/0003195 A1* | 1/2015 | Widmaier et al. | 367/16 |

OTHER PUBLICATIONS

Thoros, Eric I., "The validity of the Kirchhoff approximation for rough surface scattering using a Gaussian roughness spectrum", J. Acoust. Soc. Am 83(1), Jan. 1988, pp. 78-92.

Amundsen, Lasse et al., "Extraction of the normal component of the particle velocity from marine pressure data", Geophysics, vol. 60, No. 1 (Jan.-Feb. 1995); pp. 212-222.

Orji, Okwudili C., et al., "Imaging time varying sea surface using dual sensor data", SEG San Antonio 2011 Annual Meeting, pp. 3388-3392.

Orji, Okwudili C., et al., "Effects of time-varying sea surface in marine seismic data", Geophysics, Sep. 27, 2011, pp. 1-45.

Orji, Okwudili, et al., "Imaging the sea surface using a dual-sensor towed streamer," Geophysics, vol. 75., No. 6, Nov.-Dec. 2010.

European Search Report, Jun. 5, 2015.

\* cited by examiner

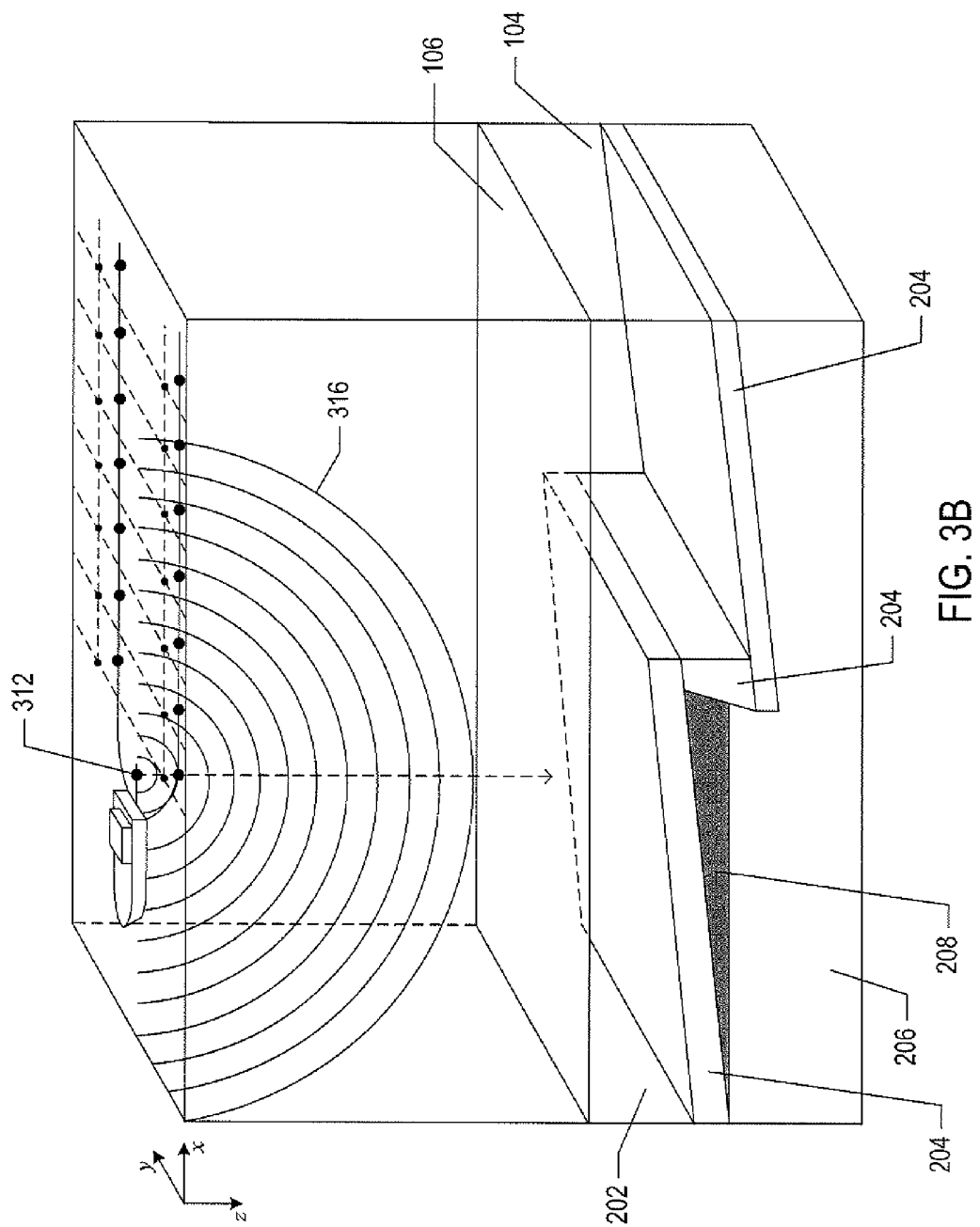

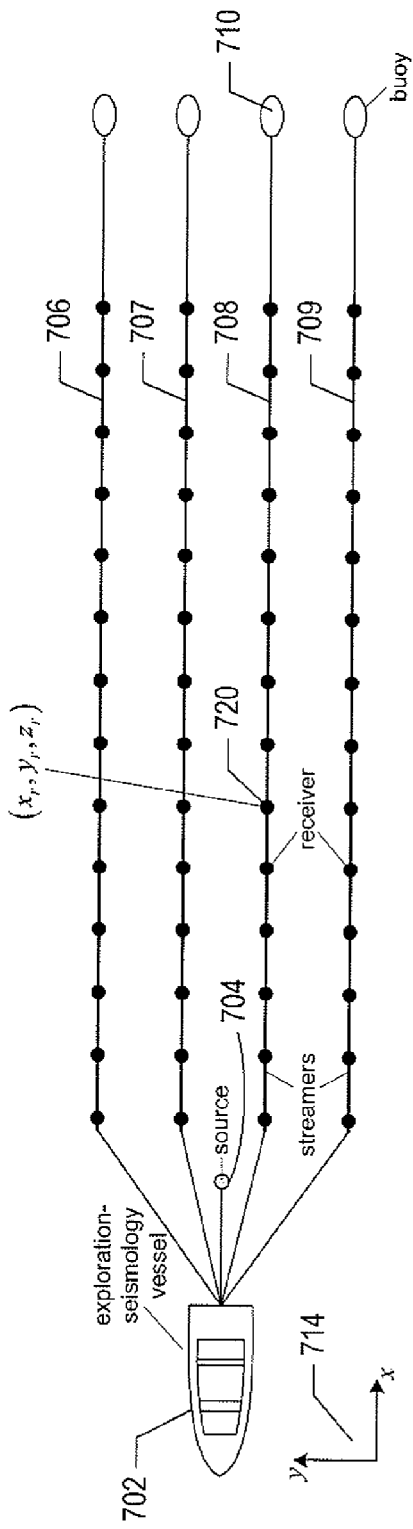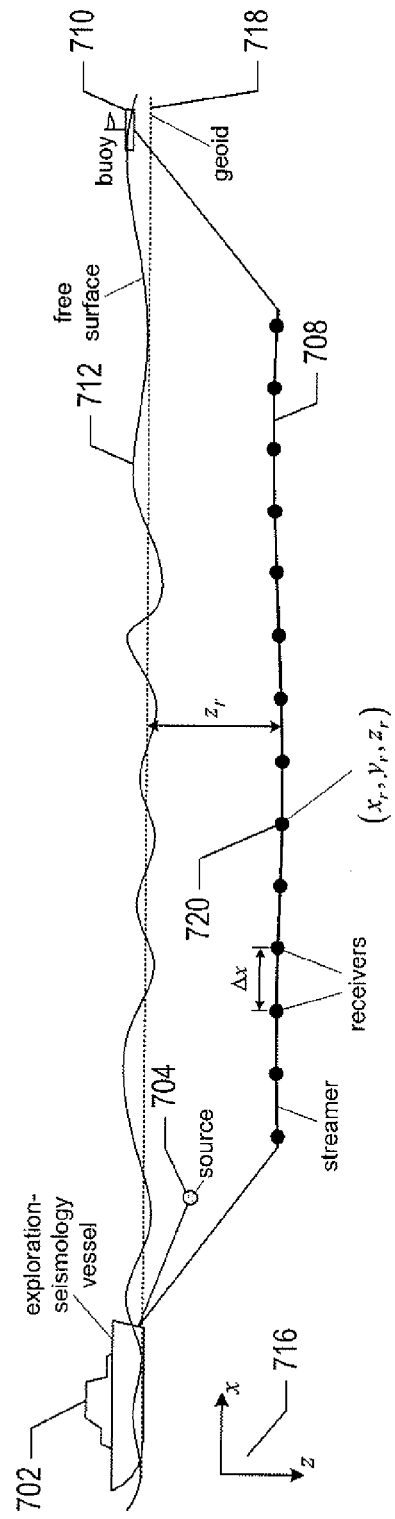
FIG. 7A
FIG. 7B

METHODS AND SYSTEMS FOR RECONSTRUCTION OF LOW FREQUENCY PARTICLE VELOCITY WAVEFIELDS AND DEGHOSTING OF SEISMIC STREAMER DATA

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and improved reservoir monitoring. For a typical marine seismic survey, an exploration-seismology vessel tows one or more seismic sources and one or more streamers below the surface of the water and over a subterranean formation to be surveyed for mineral deposits. The vessel contains seismic acquisition equipment, such as navigation control, seismic source control, seismic receiver control, and recording equipment. The seismic source control causes the one or more seismic sources, which are typically air guns, to produce acoustic impulses at selected times. Each impulse is a sound wave that travels down through the water and into the subterranean formation. At each interface between different types of rock, a portion of the sound wave is refracted, a portion of the sound wave is transmitted, and another portion is reflected back toward the body of water to propagate toward the surface. The streamers towed behind the vessel are elongated cable-like structures. Each streamer includes a number of seismic receivers or sensors that detect pressure and/or particle motion changes in the water created by the sound waves reflected back into the water from the subterranean formation.

The sounds waves that propagate upwardly from the subterranean formation are referred to as "up-going" wavefields that are detected by the receivers and converted into seismic signals that are recorded by the recording equipment and processed to produce seismic images that characterize the geological structure and properties of the subterranean formation being surveyed. However, seismic signals may also include "source ghost" produced by sound waves that are first reflected from the sea surface before the waves travel into the subsurface to produce scattered wavefields detected by the receivers. Source ghosts are time delayed relative to sound waves that travel directly from the source to the subterranean formation. As a result, source ghosts can amplify some frequencies and attenuate other frequencies and are typically manifest as spectral notches in the recorded seismic waveforms, which make it difficult to obtain accurate high-resolution seismic images of the subterranean formation. In addition to the "source ghosts," the seismic signal may also include "receiver ghosts" produced by scattered sound waves that are first reflected from the sea surface before reaching the receivers. The receiver ghosts can also amplify some frequencies and attenuate other frequencies and are typically manifested as receiver ghost notches. As a result, those working in the petroleum industry continue to seek systems and methods to remove the effects of ghost reflections, or "deghost" seismic signals.

DESCRIPTION OF THE DRAWINGS

FIGS. 3A-3C show an exploration-seismology method by which digitally encoded data is instrumentally acquired for subsequent exploration-seismology processing and analysis in order to characterize the structures and distributions of features and materials underlying the solid surface of the earth.

DETAILED DESCRIPTION

Computational methods and systems for receiver deghosting marine seismic streamer data are described. In particular, an exploration-seismology vessel tows a number of streamers that form a data acquisition surface located beneath an air/fluid surface referred to as the "free surface." The streamers include receivers that measure pressure and particle motion wavefields that are digitally encoded and stored. The methods computationally deghost or substantially remove the receiver ghost signals from the seismic data recorded by the receivers independent of the free surface conditions or the shape of the data acquisition surface. In other words, the methods described below computationally remove receiver ghost signals from the seismic data without assuming restrictions on the free surface or assuming restrictions on the shape of the data acquisition surface, such as assuming a "frozen" (i.e., stationary) flat free surface and assuming a "frozen" flat and horizontal data acquisition surface. The deghosting methods include low frequency compensation to recover vertical velocity wavefield information that is typically lost due to the low signal-to-noise ratio over a low frequency range.

The following discussion includes two subsections: in subsection (I), an overview of exploration seismology is provided; and in subsection (II) a discussion of computational processing methods for receiver deghosting seismic signal data as an example of computational processing methods and systems to which this disclosure is directed. Reading of the first subsection can be omitted by those already familiar with marine exploration seismology.

I. An Overview of Marine Exploration Seismology

Figure 1:
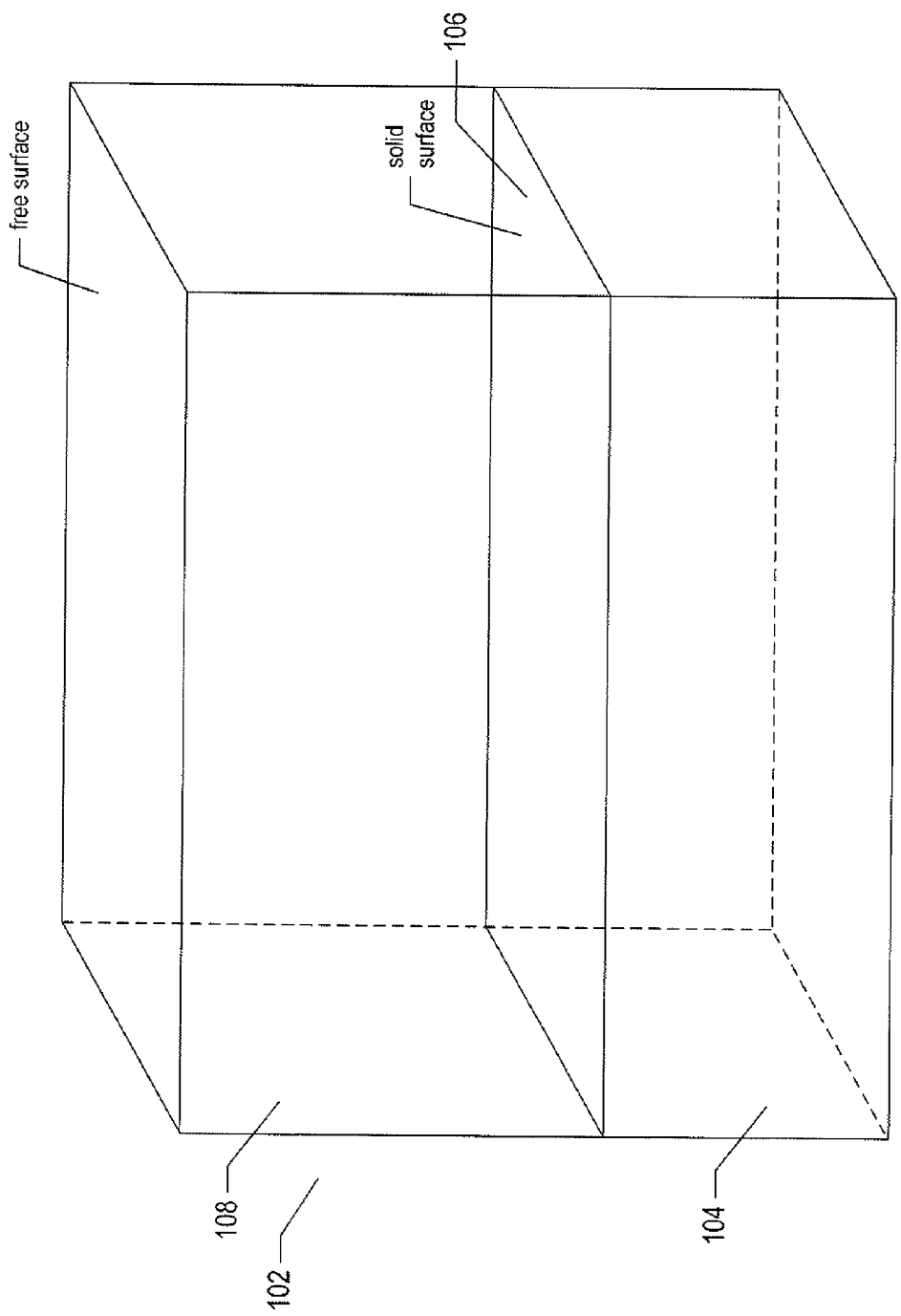
FIG. 1 shows a domain volume of the earth's surface.

FIG. 1 shows a domain volume of the earth's surface. The domain volume 102 comprises a solid volume of sediment and rock 104 below the solid surface 106 of the earth that, in turn, underlies a fluid volume of water 108 within an ocean, an inlet or bay, or a large freshwater lake. The domain volume shown in FIG. 1 represents an example experimental domain for a class of exploration-seismology observational and analytical techniques and systems referred to as "marine exploration seismology."

Figure 2:
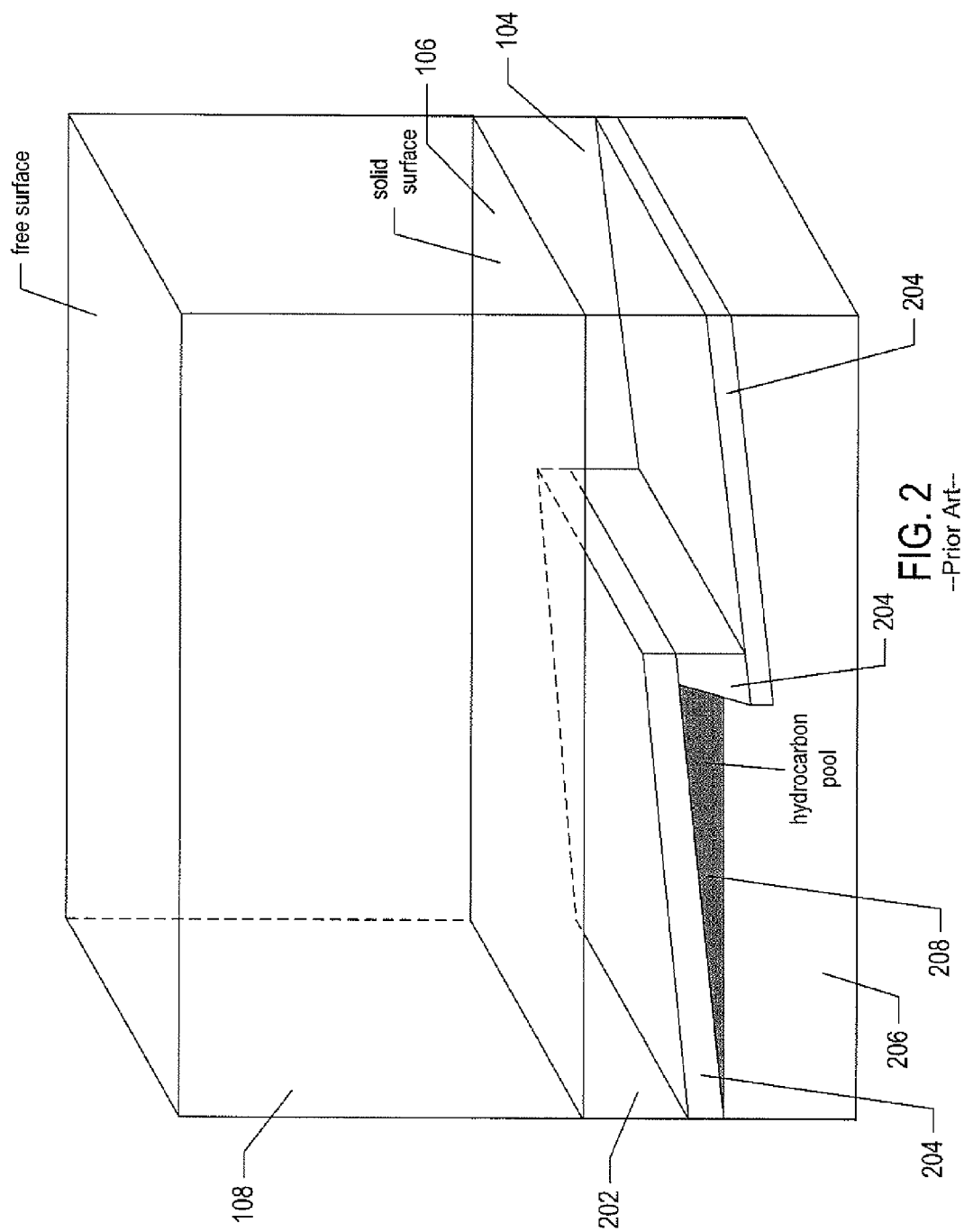
FIG. 2 shows subsurface features of a subterranean formation in the lower portion of the domain volume shown in FIG. 1.

FIG. 2 shows subsurface features of a subterranean formation in the lower portion of the domain volume shown in FIG. 1. As shown in FIG. 2, for exploration-seismology purposes, the fluid volume 108 is a relatively featureless, generally homogeneous volume overlying the solid volume 104 of interest. However, while the fluid volume 108 can be explored, analyzed, and characterized with relative precision using many different types of methods and probes, including remote-sensing submersibles, sonar, and other such devices and methods, the volume of solid crust 104 underlying the fluid volume is comparatively far more difficult to probe and characterize. Unlike the overlying fluid volume 108, the solid volume 104 is significantly heterogeneous and anisotropic, and includes many different types of features and materials of interest to exploration seismologists. For example, as shown in FIG. 2, the solid volume 104 may include a first sediment layer 202, a first fractured and uplifted rock layer 204, and a second, underlying rock layer 206 below the first rock layer. In certain cases, the second rock layer 206 may be porous and contain a significant concentration of liquid hydrocarbon 208 that is less dense than the second-rock-layer material and that therefore rises upward within the second rock layer 206. In the case shown in FIG. 2, the first rock layer 204 is not porous, and therefore forms a lid that prevents further upward migration of the liquid hydrocarbon, which therefore pools in a hydrocarbon-saturated layer 208 below the first rock layer 204. One goal of exploration seismology is to identify the locations of hydrocarbon-saturated porous strata within volumes of the earth's crust underlying the solid surface of the earth.

Figure 3A:
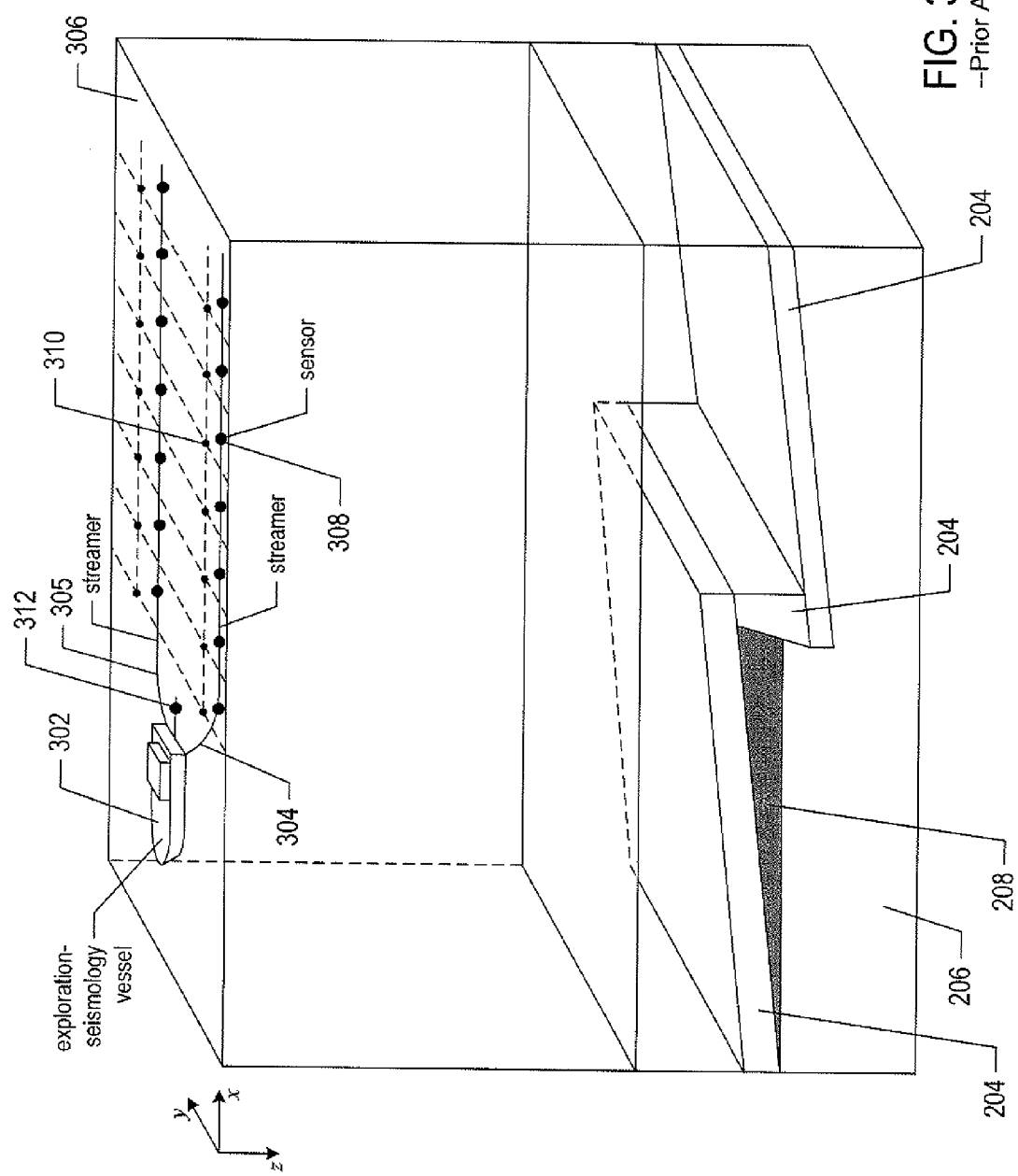
Figure 3C:
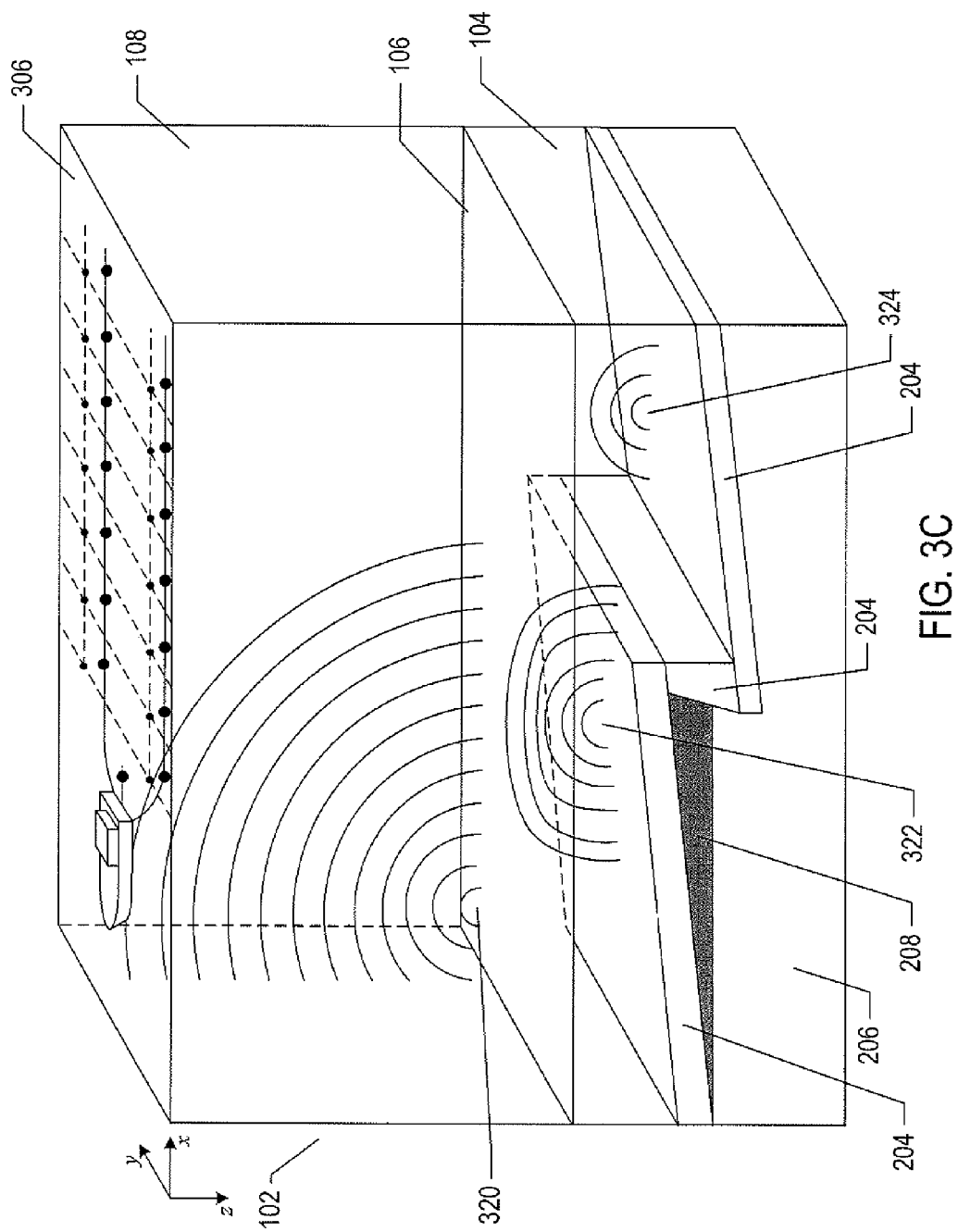

FIGS. 3A-3C show an exploration-seismology method by which digitally encoded data is instrumentally acquired for subsequent exploration-seismology processing and analysis in order to characterize the structures and distributions of features and materials of a subterranean formation. FIG. 3A shows an example of an exploration-seismology vessel 302 equipped to carry out a continuous series of exploration-seismology experiments and data collections. In particular, the vessel 302 tows one or more streamers 304-305 across an approximately constant-depth plane generally located a number of meters below the free surface 306. The streamers 304-305 are long cables containing power and data-transmission lines to which receivers, also referred to as "sensors," are connected at regular intervals. In one type of exploration seismology, each receiver, such as the receiver represented by the shaded disk 308 in FIG. 3A, comprises a pair of seismic receivers including a geophone that detects vertical displacement within the fluid medium over time by detecting particle motion, velocities or accelerations, and a hydrophone that detects variations in pressure over time. The streamers 304-305 and the vessel 302 include sophisticated sensing electronics and data-processing facilities that allow receiver readings to be correlated with absolute positions on the free surface and absolute three-dimensional positions with respect to an arbitrary three-dimensional coordinate system. In FIG. 3A, the receivers along the streamers are shown to lie below the free surface 306, with the receiver positions correlated with overlying surface positions, such as a surface position 310 correlated with the position of receiver 308. The vessel 302 also tows one or more acoustic-wave sources 312 that produce pressure impulses at spatial and temporal intervals as the vessel 302 and towed streamers 304-305 move across the free surface 306. Sources 312 may also be towed by other vessels, or may be otherwise disposed in fluid volume 108.

FIG. 3B shows an expanding, spherical acoustic wavefront, represented by semicircles of increasing radius centered at the acoustic source 312, such as semicircle 316, following an acoustic pulse emitted by the acoustic source 312. The wavefronts are, in effect, shown in vertical plane cross section in FIG. 3B. As shown in FIG. 3C, the outward and downward expanding acoustic wavefield, shown in FIG. 3B, eventually reaches the solid surface 106, at which point the outward and downward expanding acoustic waves partially reflect from the solid surface and partially refract downward into the solid volume, becoming elastic waves within the solid volume. In other words, in the fluid volume, the waves are compressional pressure waves, or P-waves, the propagation of which can be modeled by the acoustic-wave equation while, in a solid volume, the waves include both P-waves and transverse waves, or S-waves, the propagation of which can be modeled by the elastic-wave equation. Within the solid volume, at each interface between different types of materials or at discontinuities in density or in one or more of various other physical characteristics or parameters, downward propagating waves are partially reflected and partially refracted, as at solid surface 106. As a result, each point of the solid surface and within the underlying solid volume 104 becomes a potential secondary point source from which acoustic and elastic waves, respectively, may emanate upward toward receivers in response to the pressure impulse emitted by the acoustic source 312 and downward-propagating elastic waves generated from the pressure impulse.

As shown in FIG. 3C, secondary waves of significant amplitude are generally emitted from points on or close to the solid surface 106, such as point 320, and from points on or very close to a discontinuity in the solid volume 104, such as points 322 and 324. Tertiary waves may be emitted from the free surface 306 back towards the solid surface 106 in response to secondary waves emitted from the solid surface and subsurface features.

FIG. 3C also shows the fact that secondary waves are generally emitted at different times within a range of times following the initial pressure impulse. A point on the solid surface 106, such as point 320, receives a pressure disturbance corresponding to the initial pressure impulse more quickly than a point within the solid volume 104, such as points 322 and 324. Similarly, a point on the solid surface directly underlying the acoustic source receives the pressure impulse sooner than a more distant-lying point on the solid surface. Thus, the times at which secondary and higher-order waves are emitted from various points within the solid volume are related to the distance, in three-dimensional space, of the points from the acoustic source.

Acoustic and elastic waves, however, travel at different velocities within different materials as well as within the same material under different pressures. Therefore, the travel times of the initial pressure impulse and secondary waves emitted in response to the initial pressure impulse are complex functions of distance from the acoustic source as well as the materials and physical characteristics of the materials through which the acoustic wave corresponding to the initial pressure impulse travels. In addition, as shown in FIG. 3C for the secondary wave emitted from point 322, the shapes of the expanding wavefronts may be altered as the wavefronts cross interfaces and as the velocity of sound varies in the media traversed by the wave. The superposition of waves emitted from within the domain volume 102 in response to the initial pressure impulse is a generally very complicated wavefield that includes information about the shapes, sizes, and material characteristics of the domain volume 102, including information about the shapes, sizes, and locations of the various reflecting features within the subterranean formation of interest to exploration seismologists.

Figure 4A:
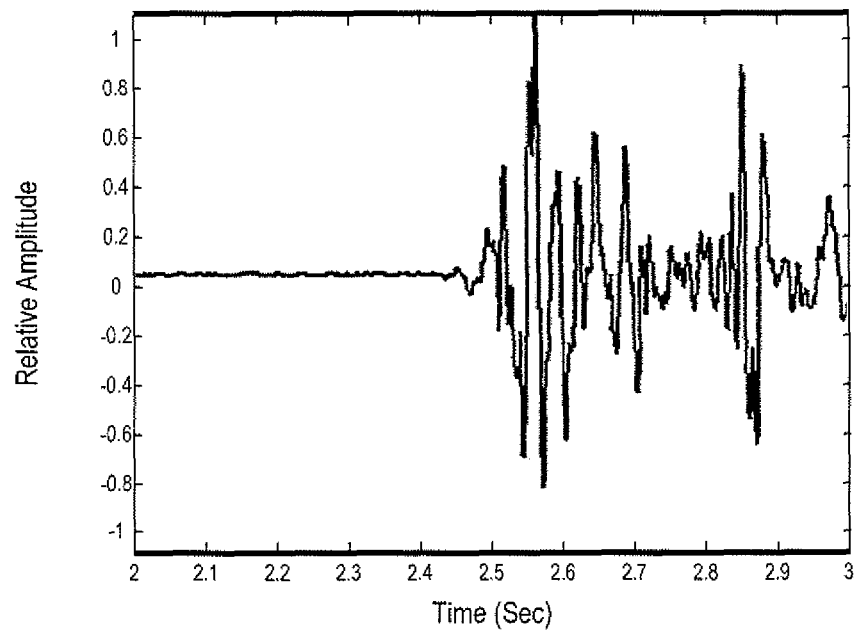
FIGS. 4A-4C show processed waveforms generated from hydrophone and geophone outputs.
Figure 4B:
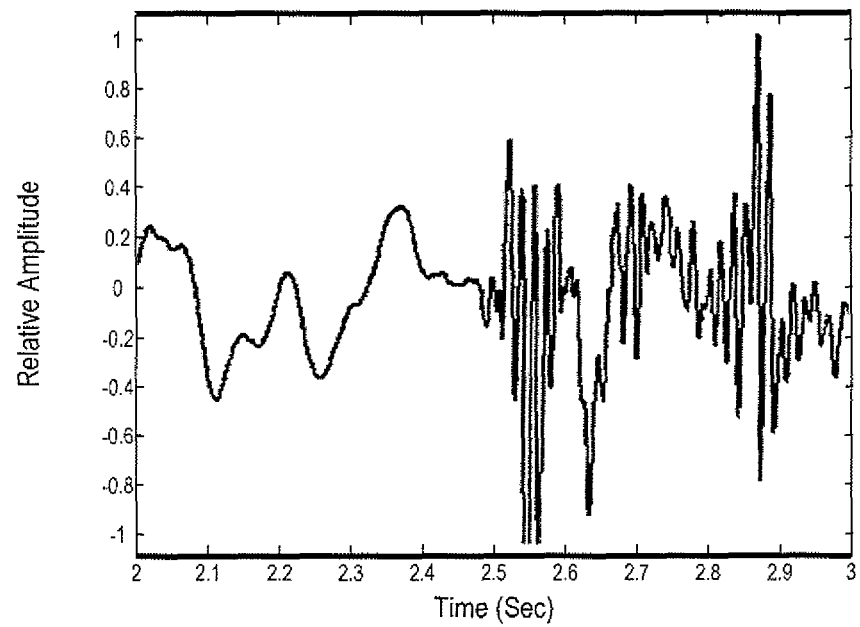
Figure 4C:
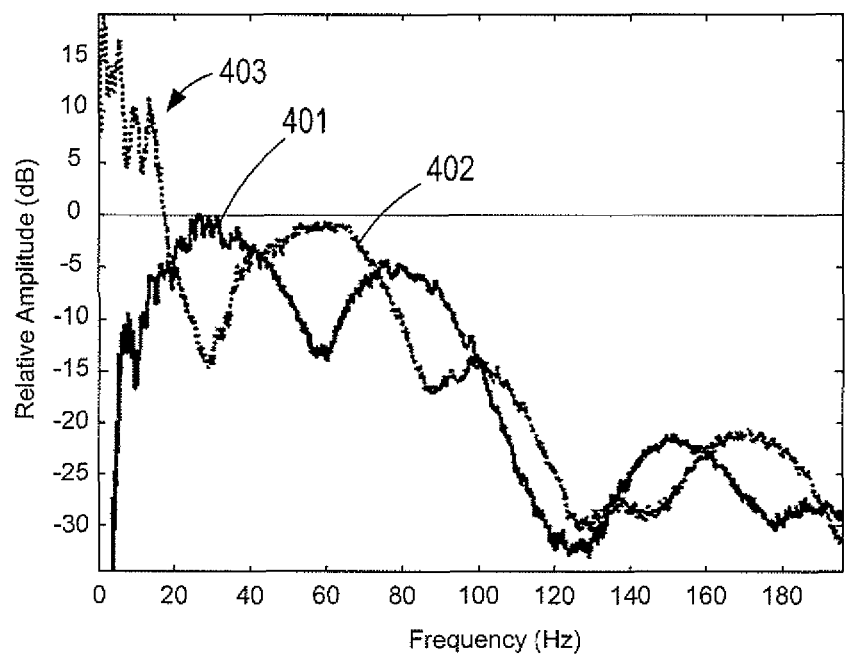

The complicated wavefield that ensues in response to the initial pressure impulse is sampled, over time, by the receivers positioned along the streamers towed by an exploration-seismology vessel. FIGS. 4A-4B show processed waveforms generated by a hydrophone and a geophone, respectively. As shown in FIG. 4A, the waveform recorded by the hydrophone represents the pressure at times following the initial pressure impulse, with the amplitude of the waveform at a point in time related to the pressure at the hydrophone at the point in time. Similarly, as shown in FIG. 4B, the geophone provides an indication of the fluid particle motion or velocity or acceleration, in a vertical direction, with respect to time. The pressure and particle motion signals represented by the waveforms in FIGS. 4A and 4B can be utilized to generate pressure wavefields and vertical velocity wavefields that, in turn, can be used for seismic processing, such as attenuation of multiples in marine seismic data. However, because the recorded particle motion signals are often contaminated with low frequency noise due to vibrations of the towed streamers, the signal-to-noise ratio over a low frequency range for the combined signals is poor. FIG. 4C shows a plot of relative amplitude versus a range of acoustic frequencies of the example pressure and particle motion signals represented in FIGS. 4A and 4B. Solid curve 401 and dotted curve 402 represent the recorded pressure and motion signals, respectively. FIG. 4C reveals a portion 403 of the particle motion signals with relative amplitudes greater than zero, which corresponds to a low signal-to-noise ratio over a low frequency range from 0 Hz to an acoustic threshold frequency, $f_{th}$, which in the example of FIG. 4C is about 20 Hz. As a result, the particle motion signal below the threshold frequency $f_{th}$ typically cannot be used to perform seismic processing. On the other hand, the pressure wavefield below the threshold frequency $f_{th}$ can be used to recreate certain information lost by the particle motion sensor when the spectrum of the pressure signal has a satisfactory signal-to-noise ratio and when the depth of the pressure and particle motion sensors is known. As a result, the depth of the streamer is selected so that the frequency of the first spectral notch in the pressure sensor signal caused by surface reflections is higher than the threshold frequency $f_{th}$.

Figure 5:
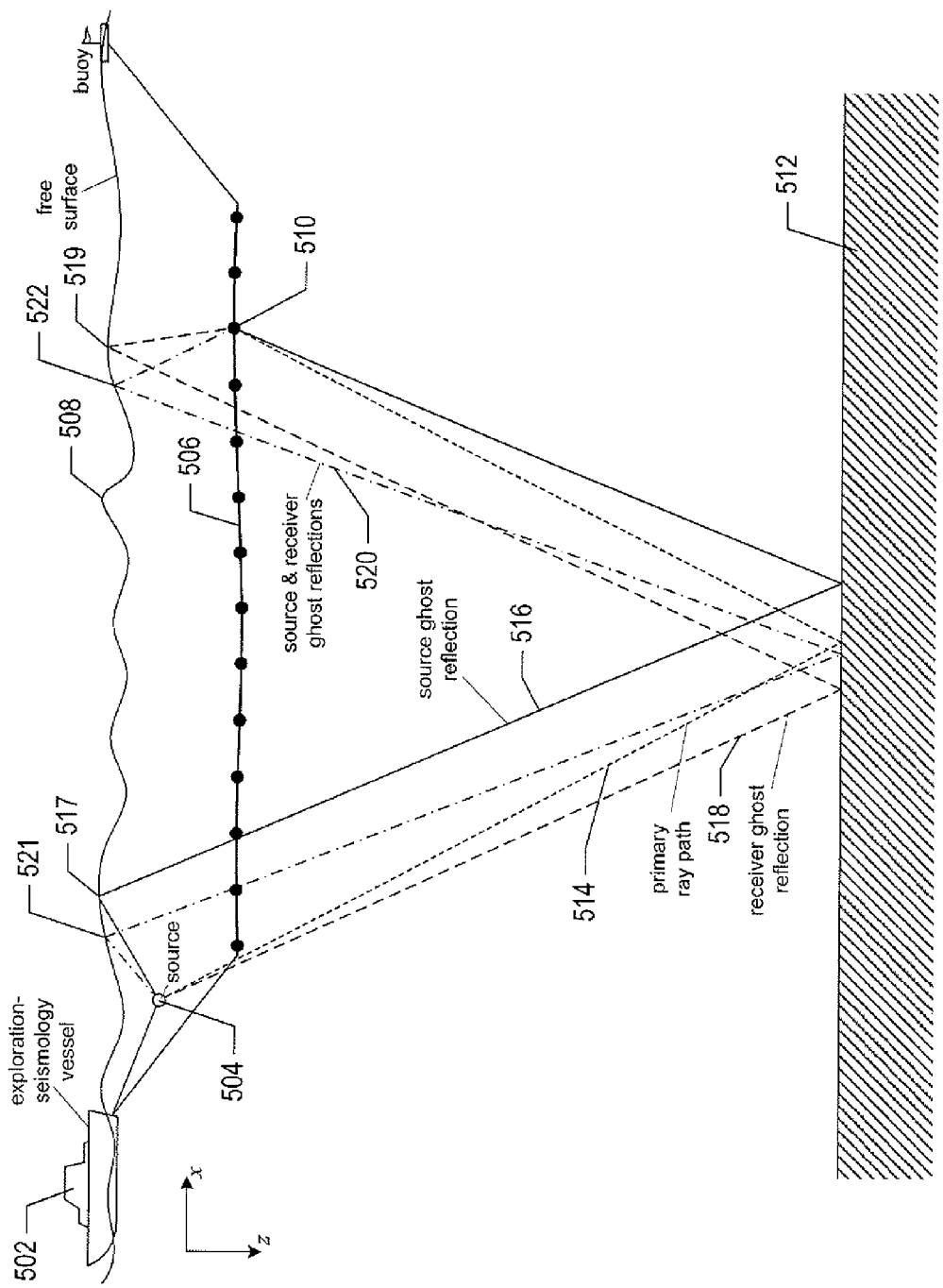
FIG. 5 shows an elevation view of an exploration-seismology vessel towing a source and a streamer located below a free surface.

The free surface acts as a near perfect acoustic reflector, causing "ghost" effects in recorded seismic data. At the source location of each impulse, a time delayed reflection from the free surface, called a "source ghost," trails the seismic wavefield that travels directly from the source into the subsurface of the earth. As a result, both low and high frequency information is penalized, and the earth subsurface cannot be accurately imaged with all seismic frequencies. In addition, at each receiver location along a streamer, a time delayed reflection from the free surface, called a "receiver ghost," interferes in a continuous and undesirable manner with the seismic wavefield scattered directly from the earth subsurface to the receiver. FIG. 5 shows an elevation view of an exploration-seismology vessel 502 towing a source 504 and a streamer 506 located below a free surface 508. FIG. 5 includes four ray paths that represent four ways in which wavefields associated with the same impulse can travel from the source 504 to a receiver 510 located along the streamer 506. Dash line 514 represents a primary ray or direct path in which an impulse output from the source 504 travels directly into the subsurface 512 and associated scattered wavefields travel directly from the subsurface 512 to the receiver 510. Solid line 516 represents a ray path that includes a source ghost 517 produced by sound waves that are first reflected from the free surface 508 before entering the subsurface 512 to produce scattered wavefields that travel directly from the subsurface 512 to the receiver 510. Long dash line 518 represents a ray path that includes a receiver ghost 519 produced by sound waves that travel directly from the source 504 to the subsurface 512 to produce scattered wavefields that are reflected from the free surface 508 before being detected by the receiver 510. Dot dash line 520 represents a ray path that includes both a source ghost 521 and a receiver ghost 522.

The scattered wavefields associated with primary ray paths are ideally the desired seismic wavefields to be detected by the receivers. In practice, however, source ghosts and receiver ghosts are also detected, and because the ghosts are time delayed, the ghosts can interfere constructively and destructively with the recorded waveforms of the seismic wavefield. As a result, ghosts can lead to inaccurate seismic images of the subterranean formation located beneath the fluid volume. Computational methods and systems described below are directed to receiver deghosting seismic signal data for a time-varying, arbitrarily-rough free surface and without restrictions on the shape of the data acquisition surface defined by the steamers. The methods are also not limited to using pressure and vertical velocity wavefields above the threshold frequency $f_{th}$. In other words, receiver deghosting of seismic signal data can be accomplished for pressure and vertical velocity wavefields over the full frequency range.

II. Methods for Receiver Deghosting as an Example of Computational Processing

Methods and Systems

Figure 6:
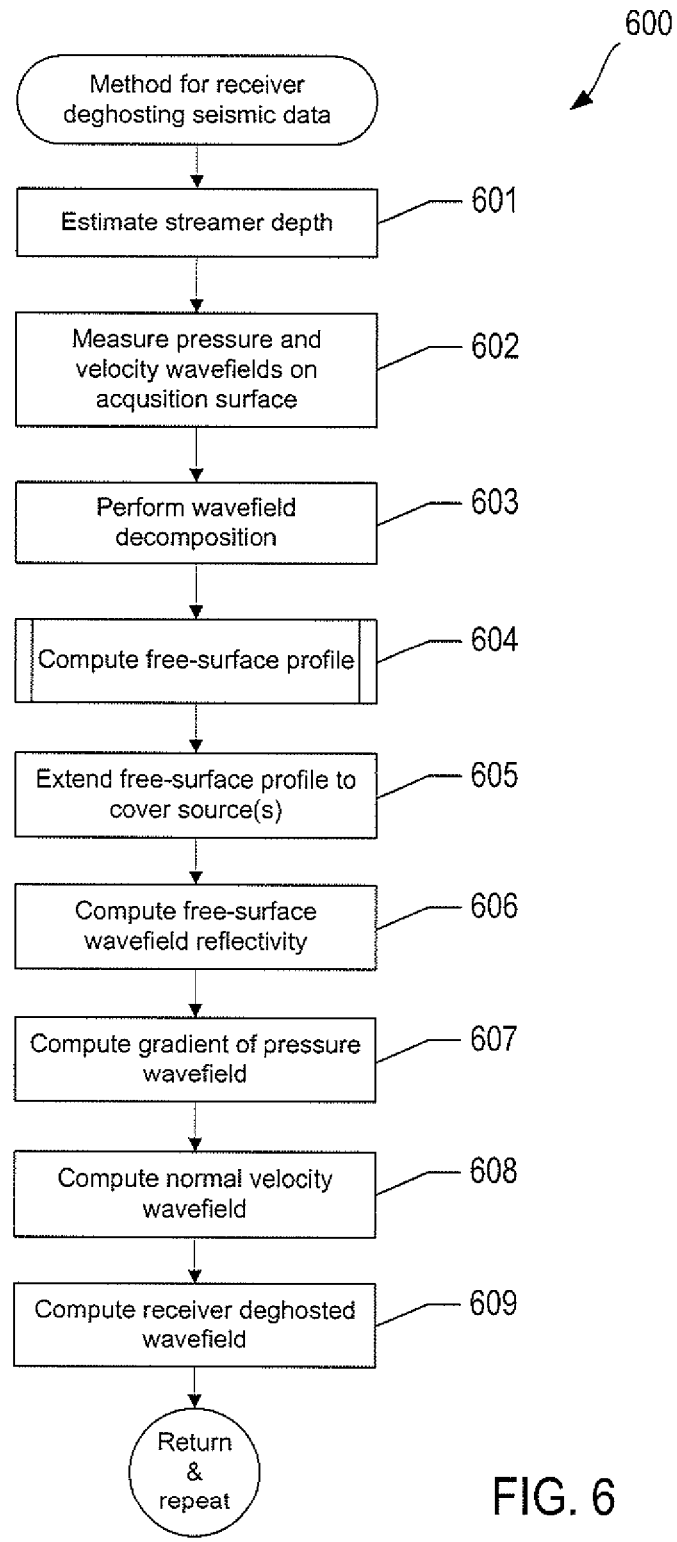
FIG. 6 shows a flow diagram associated with a method for source deghosting seismic signal data FIGS. 7A-7B introduce coordinates and terminology associated with a computational process for source deghosting.

FIG. 6 shows a control-flow diagram 600 associated with a computational method for receiver deghosting seismic signal data with low frequency compensation. The flow diagram 600 summarizes an overall computational process for receiver deghosting seismic data. Each block of the diagram 600 is described below in a separate subsection.

Estimating Streamer Depth

In block 601 of FIG. 6, the streamer depth is estimated. FIGS. 7A-7D introduce coordinates and terminology associated with a computational process for receiver deghosting. FIG. 7A shows a top or xy-plane view of an example exploration-seismology vessel 702 towing a source 704 and four separate streamers 706-709 located beneath a free surface. Each streamer is attached at one end to the vessel 702 and at the opposite end to a buoy, such as a buoy 710 attached to the steamer 708. The streamers 706-709 ideally form a planar horizontal acquisition surface located beneath the free surface. However, in practice, the acquisition surface can be smoothly varying in the z-direction due to active sea currents and weather conditions. In other words, the towed streamers may also undulate as a result of dynamic conditions of the fluid. FIG. 7B shows an elevation or xz-plane view of the streamer 708 located beneath a free surface 712. FIG. 7B represents a snapshot, at an instant in time, of the undulating free surface 712 and corresponding smooth wave-like shape in the streamer 708. FIG. 7A includes xy-plane 714 and FIG. 7B includes a xz-plane of the same Cartesian coordinate system used to specify coordinate locations within the fluid volume with respect to three orthogonal, spatial coordinate axes labeled x, y and z. The x coordinate uniquely specifies the position of a point in a direction parallel to the length of the streamers, and the y coordinate uniquely specifies the position of a point in a direction perpendicular to the x axis and substantially parallel to the free surface 712, and the z coordinate uniquely specifies the position of a point perpendicular to the xy-plane. As shown in FIG. 7B, the streamer 708 is at a depth, $z_r$, which can be estimated at various locations along the streamers from hydrostatic pressure measurements made by depth controllers (not shown) attached to the streamers. The depth controllers are typically placed at about 300 meter intervals along each streamer. The estimated streamer depths are then used to calculate a two-dimensional interpolated streamer shape that approximates the wave-like shape of an actual streamer at an instant in time. Alternatively, the estimated streamer depths can be used to calculate a three-dimensional interpolated surface approximation of the acquisition surface. The depth $z_r$ and the elevation of the free-surface profile are estimated with respect to the geoid, which is represented in FIG. 7B by dotted line 718. The geoid is the hypothetical surface of the earth that coincides everywhere with mean sea level and is used to define zero elevation (i.e., z=0). Shaded disks, such as shaded disk 720, represent receivers spaced at regular intervals, $\Delta x$. The coordinates of the receiver 720 are given by $(x_r, y_r, z_r)$, where the depth $z_r$ can be an interpolated value.

Measuring Pressure and Velocity Wavefields

Figure 8:
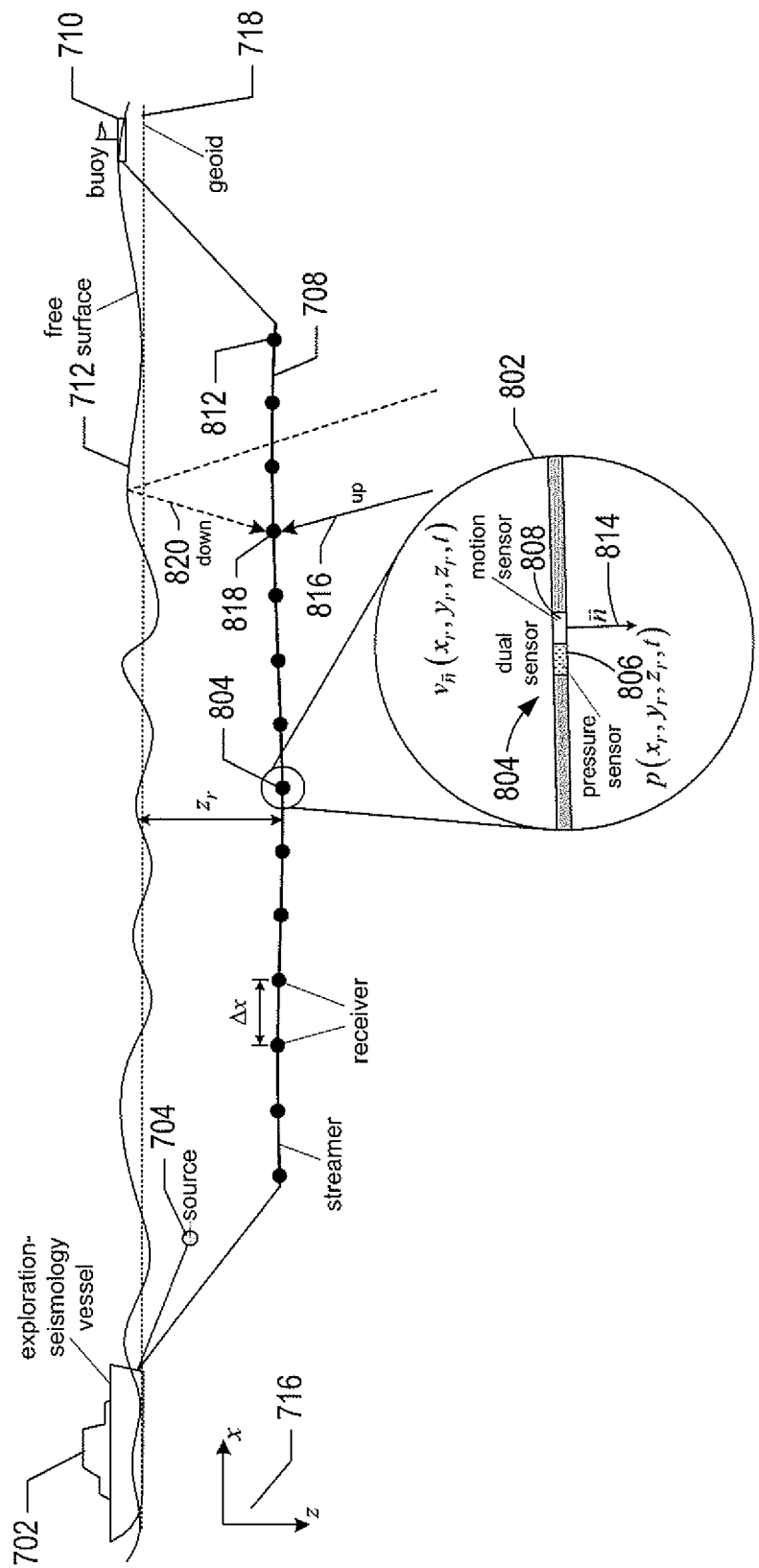
FIG. 8 shows an elevation view of an exploration-seismology vessel and a streamer and includes a magnified view of a receiver located along the streamer.

Returning to FIG. 6, in block 602, pressure and velocity wavefields are measured at the receivers. FIG. 8 also shows an elevation view of the vessel 702 and the streamer 708 and includes a magnified view 802 of a receiver 804 located along the streamer 708. The magnified view 802 reveals that the receivers are actually dual sensors that include a pressure sensor 806, such as a hydrophone, and a motion sensor 808, such as a geophone. Each pressure sensor measures a pressure wavefield denoted by $p(x_r, y_r, z_r, t)$ and each motion sensors measures a velocity wavefield denoted by $\vec{v}_{\vec{n}}(x_r, y_r, z_r, t)$, where $x_r = m\Delta x$ and y represent the x- and y-spatial coordinate of the sensor, and t represents time. The index m is a positive integer used to identify the receiver and is also referred to as a "channel" index. The acquisition surface, as shown in FIG. 7A, has 4 streamers 706-709 and each streamer includes 14 receivers. The receivers can be indexed 0 through 13. For example, a receiver 810 of the streamer 708 located closest to the vessel 702 can be assigned channel index m=0, and a receiver 812 located along the same streamer 708 farthest from the vessel 702 can be assigned channel index m=13, with dual sensors in between indexed consecutively from 1 to 12. The motion sensors may be mounted within a gimbal in order to orient the motion sensors to detect particle motion in a direction normal to the streamer as represented by unit normal vector 814 in magnified view 802. Thus, the motion sensors measure a velocity wavefield $\vec{v}_{\vec{n}}$ directed normal to the smoothly varying streamer 708, where the subscript vector $\vec{n}$ represents a normal unit vector that points in the direction 814 normal to the streamer 608 in the xz-plane. However for particle motion measured below the threshold frequency $f_{th}$, the signal-to-noise ratio is typically low as described above with reference to FIG. 4C. As a result, the vertical velocities below the threshold frequency $f_{th}$ cannot typically be accurately determined. Methods include low frequency compensation described below to calculate the vertical velocity wavefields at the streamer receivers below the threshold frequency $f_{th}$.

Wavefield Decomposition

Returning to FIG. 6, in block 603 wavefield decomposition is performed on the pressure and velocity wavefields for frequencies greater than the threshold frequency $f_{th}$ described above with reference to FIG. 4C. In the following description the y-spatial component is ignored in order to simplify the description. Note that in practice the y-spatial component is included. In other words, in the discussion that follows, the three spatial coordinates of the measured pressure wavefield $p(x_r, y_r, z_r, t)$ are reduced to two spatial coordinates in pressure wavefield representation, $p(x_r, z_r, t)$, and the three spatial coordinates of the measured velocity wavefield $\vec{v}_{\vec{n}}(x_r, y_r, z_r, t)$ are reduced to two spatial coordinates in velocity wavefield representation, $\vec{v}_{\vec{n}}(x_r, z_r, t)$. The reduction to two spatial coordinates gives clear insight while preserving the main features of the method.

The pressure and velocity wavefields can be decomposed into up-going and down-going pressure and vertical velocity components. In FIG. 8, directional arrow 816 represents the direction of an up-going wavefield detected by a receiver 818 and dashed line directional arrow 820 represents the direction of a down-going wavefield reflected from the free surface 712 and detected by the receiver 818. In other words, the pressure wavefield $p(x_r, z_r, t)$ is composed of an up-going pressure component and a down-going pressure component, and the velocity wavefield $\vec{v}_{\vec{n}}(x_r, z_r, t)$ is also composed of an up-going vertical velocity component and a down-going vertical velocity component. The down-going pressure wavefield and the down-going vertical velocity wavefield are receiver ghosts wavefields, and the up-going pressure wavefield and the up-going vertical velocity wavefield are receiver deghosted wavefields.

Figure 9A:
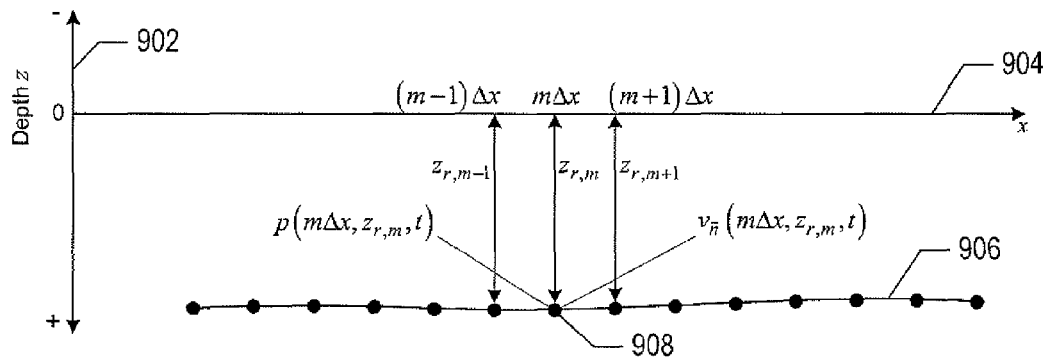
FIGS. 9A-9C each show an example plot that represents an aspect of wavefield decomposition.
Figure 9B:
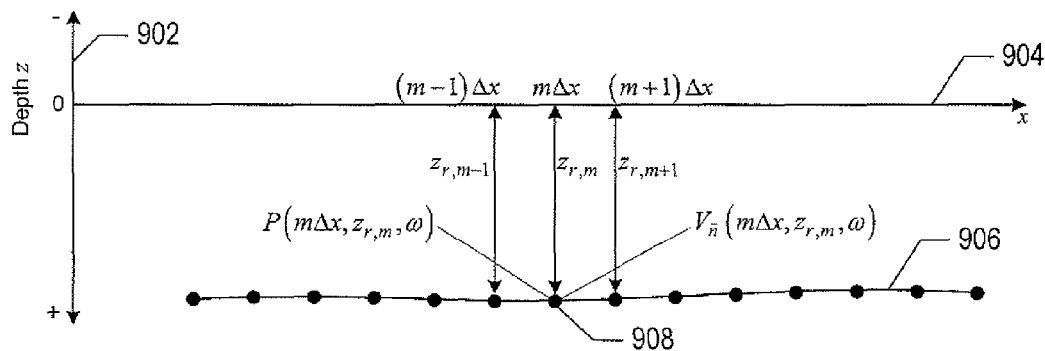
Figure 9C:
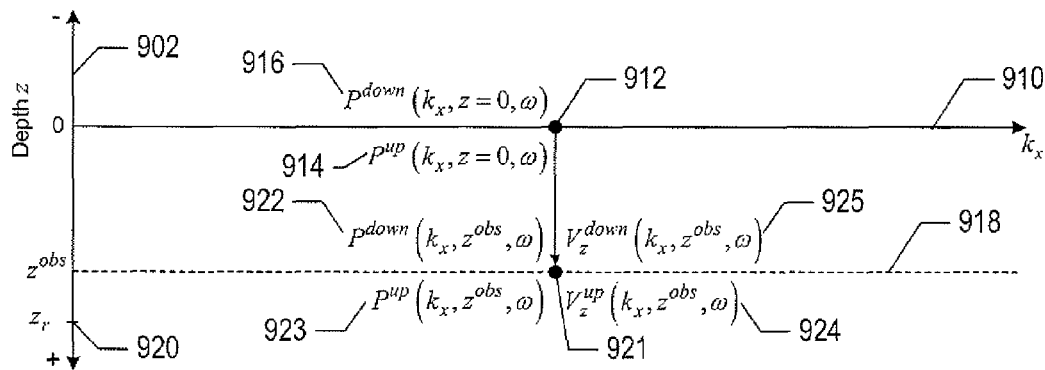

FIGS. 9A-9C each show an example plot that represents an aspect of wavefield decomposition. In FIGS. 9A-9C, vertical axis 902 is a z-coordinate axis that represents the depth or z-spatial dimension, and in FIGS. 9A-9B, horizontal axis 904 is an x-coordinate axis that represents the x-spatial dimension. The "0" z-spatial coordinate corresponds to a plane tangent at x=0 to the geoid 718 described above with reference to FIG. 7B. FIG. 9A shows an example plot of an interpolated streamer 906 based on the estimated depths obtained from depth controllers attached to the actual streamer as described above with reference to FIG. 7. The shape of the interpolated streamer 906 substantially matches the shape of the streamer 708 shown in FIG. 7B. Shaded disks, such as shaded disk 908, represent the locations of receivers along the interpolated streamer 906. The pressure wavefield $p(m\Delta x, z_{r,m}, t)$ and velocity wavefield $v_{\vec{n}}(m\Delta x, z_{r,m}, t)$ associated with each receiver is transformed from the space-time domain to a pressure wavefield $P(m\Delta x, z_{r,m}, \omega)$ and a velocity wavefield $V_{\vec{n}}(m\Delta x, z_{r,m}, \omega)$ in the space-frequency domain, where $\omega=2\pi f$ is the angular frequency for the acoustic frequencies f detected by the dual sensors. For example, the pressure wavefield and the velocity wavefield associated with a receiver can be transformed using Fourier transforms:

$$P(m\Delta x, z_{r,m}, \omega) = \int_{-\infty}^{\infty} p(m\Delta x, z_{r,m}, t) e^{-j\omega t} dt \quad (1)$$

$$V_{\vec{n}}(m\Delta x, z_{r,m}, \omega) = \int_{-\infty}^{\infty} v_{\vec{n}}(m\Delta x, z_{r,m}, t) e^{-j\omega t} dt \quad (2)$$

where j is the imaginary unit $\sqrt{-1}$. In practice, the transformation can be carried out using a discrete Fast-Fourier Transform ("FFT") for computational efficiency. Note that lower-case letters p and v are used to represent quantities in the space-time domain while upper-case letters P and V are used to represent quantities in the space-frequency or wavenumber-frequency domain. FIG. 9B shows an example plot of the interpolated streamer 906 with the pressure and velocity wavefields transformed to the space-frequency domain.

After the pressure and velocity wavefields associated with each receiver have been transformed from the space-time domain to the space-frequency domain, the pressure wavefields and the velocity wavefields are combined to produce an up-going pressure component at the geoid (i.e., z=0) in the wavenumber-frequency domain. Pressure sensors alone cannot distinguish between the opposing polarity of the seismic wavefield scattered up from the subterranean formation and the time-delayed seismic wavefield reflected down from the sea surface (i.e., receiver ghost), but the information obtained from the particle motion sensors can be used to distinguish the polarity of the seismic wavefield. A mathematical expression relating the pressure and velocity wavefields to an up-going pressure component of the pressure wavefield at the geoid is given by:

$$P^{up}(k_x, z=0, \omega) = \qquad (3)$$
$$\frac{\Delta x}{-2jk_z}\sum_{m=0}^{M-1}\left\{\begin{array}{l} j\omega\rho V_{\vec{n}}^{th}(m\Delta x, z_{r,m}, \omega)e^{(jk_x m\Delta x - jk_z z_{r,m})} + \\ P(m\Delta x, z_{r,m}, \omega)e^{(jk_x m\Delta x - jk_z z_{r,m})}(jk_x n_x - jk_z n_z) \end{array}\right\}$$

where $k_z$ is the vertical wavenumber in the z-direction given by:

$$k_z = \sqrt{\left(\frac{\omega}{c}\right)^2 - k_x^2}$$

with c the speed of sound in the fluid;
$k_x$ is the horizontal wavenumber in the x-spatial direction
m is the dual sensor or channel index;
M is the total number of dual sensors located along the streamer;
$\rho$ is the density of the fluid;
$z_{r,m}$ is the interpolated depth of the streamer at the $m^{th}$ dual sensor;

$n_x$ is the x-component of the normal vector $\vec{n}$;
$n_z$ is the z-component of the normal vector $\vec{n}$; and
$V_{\vec{n}}^{th}(m\Delta x, z_{r,m}, \omega)$ is the velocity wavefield for angular frequencies greater than an angular threshold frequency $\omega_{th}$ (i.e., $\omega_{th}=2\pi f_{th}$).

Analogously, the down-going pressure component in the wavenumber-frequency domain at z=0 is calculated in a similar manner by:

$$P^{down}(k_x, z=0, \omega) = \qquad (4)$$
$$\frac{\Delta x}{2jk_z}\sum_{m=0}^{M-1}\left\{\begin{array}{l} j\omega\rho V_{\vec{n}}^{th}(m\Delta x, z_{r,m}, \omega)e^{(jk_x m\Delta x + jk_z z_{r,m})} + \\ P(m\Delta x, z_{r,m}, \omega)e^{(jk_x m\Delta x + jk_z z_{r,m})}(jk_x n_x + jk_z n_z) \end{array}\right\}$$

Note that the up-going pressure wavefield, $P^{up}$ and the down-going pressure wavefield, $P^{down}$ are computed from the pressure wavefield, P, and the velocity wavefield, $V_{\vec{n}}^{th}$.

FIG. 9C shows an example plot of the wavenumber-frequency domain. Horizontal axis 910 represents the wavenumber $k_x$ coordinate axis. Note that the angular frequency axis w is perpendicular to the $k_x z$-plane, which is not represented in FIG. 9C. Shaded disk 912 represents a point in the wavenumber-frequency domain located along the $k_x$ coordinate axis 910. The wavenumber-frequency domain point 912 has associated up-going and down-going pressure plane wavefield components $P^{up}(k_x, z=0, \omega)$ 914 and $P^{down}(k_x, z=0, \omega)$ 916.

After the up-going and down-going pressure wavefield components at the geoid have been determined in the wavenumber-frequency domain, the pressure wavefield components are shifted to an observation level at a depth, $z^{obs}$, between the geoid and the streamer. In FIG. 9C, dashed line 918 represents the $k_x$ axis at an observation level located between the geoid and the streamer indicated at the z-axis by $z_r$ 920. The depth, $z^{obs}$, of the observation level 918 lies between the geoid and the depth of the streamer 920. The up-going pressure component at a point $(k_x, z^{obs})$ 921 along the observation level $z^{obs}$ 918 is calculated from $P^{up}(k_x, z=0, \omega)$ by:

$$P^{up}(k_x, z^{obs}, \omega) = P^{up}(k_x, z=0, \omega)e^{jk_z z^{obs}} \qquad (5)$$

Likewise, the down-going pressure component at the observation level $z^{obs}$ 918 is calculated by:

$$P^{down}(k_x, z^{obs}, \omega) = P^{down}(k_x, z=0, \omega)e^{-jk_z z^{obs}} \qquad (6)$$

The up-going vertical velocity component at the point $(k_x, z^{obs})$ 921 is calculated from the up-going pressure component $P^{up}(k_x, z^{obs}, \omega)$ by:

$$V_z^{up}(k_x, z^{obs}, \omega) = -\frac{k_z}{\rho\omega}P^{up}(k_x, z^{obs}, \omega) \qquad (7)$$

The down-going vertical velocity component at the point $(k_x, z^{obs})$ 921 is calculated from the down-going pressure component $P^{down}(k_x, z^{obs}, \omega)$ by:

$$V_z^{down}(k_x, z^{obs}, \omega) = \frac{k_z}{\rho\omega}P^{down}(k_x, z^{obs}, \omega) \qquad (8)$$

In other embodiments, calculation of the free-surface profile can also be accomplished using the up-going and down-going vertical velocity components.

In summary, wavefield decomposition is the process of transforming the pressure wavefield p(mΔx, $z_{r,m}$, t) and velocity wavefield $v_n^{\rightarrow}$(mΔx, $z_{r,m}$, t) measured at the corresponding dual sensors of each receiver in the space-time domain, as shown in FIG. 9A, into a down-going pressure component $P^{down}(k_x, z^{obs}, \omega)$ 922, an up-going pressure component $P^{up}(k_x, z^{obs}, \omega)$ 923, a down-going vertical velocity component $v_z^{down}(k_x, z_{obs}, \omega)$ 924 and an up-going vertical velocity component $V_z^{up}(k_x, z^{obs}, \omega)$ 925 in the wavenumber-frequency domain, as shown in FIG. 9C. The $P^{up}$, $P^{down}$, $V_z^{up}$, and $V_z^{down}$ are computed from the pressure wavefield P and the velocity wavefield $V_z^{\rightarrow th}$ above the threshold frequency $\omega_{th}$ described above with reference to FIG. 4C.

Note that a three-spatial-dimensional version of the up-going and down-going pressure components and the up-going and down-going vertical velocity components can be obtained by replacing the vertical wavenumber $k_z$ by:

$$k_z = \sqrt{\left(\frac{\omega}{c}\right)^2 - k_y^2 - k_x^2}$$

where $k_y$ is the horizontal wavenumber in the y-spatial direction.

Computing a Free-Surface Profile

Figure 10A:
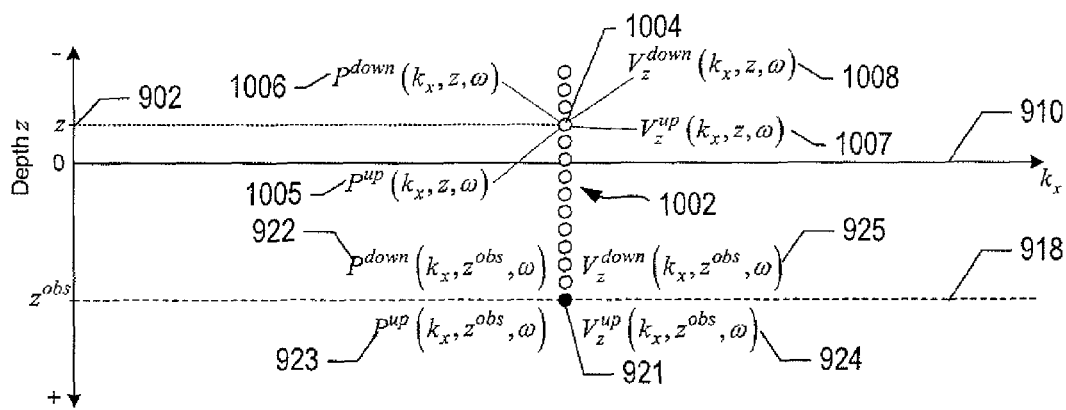
FIGS. 10A-10C each show an example plot that represents an aspect of computing an imaged free-surface profile.
Figure 10B:
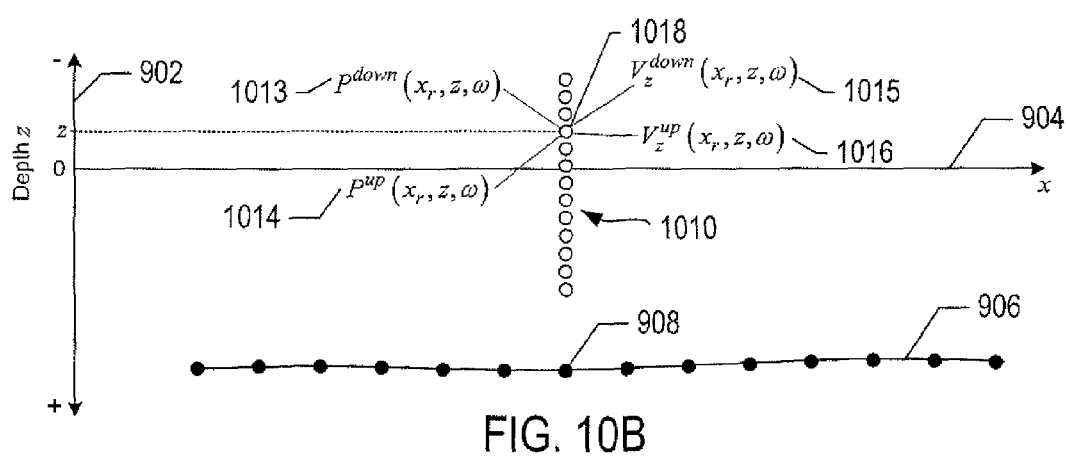
Figure 10C:
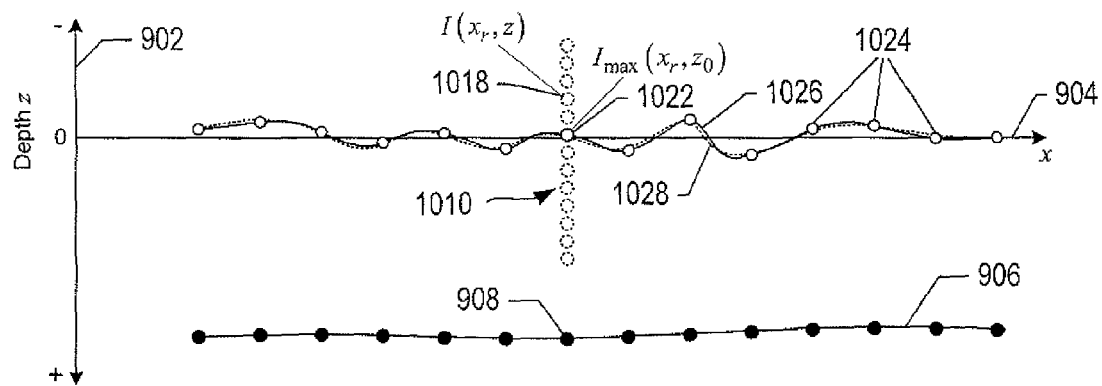

Returning to FIG. 6, after wavefield decomposition has been accomplished in block 603, an imaged free-surface profile is calculated in block 604. FIGS. 10A-10C show three different plots in a process of computing an imaged free-surface profile of an actual free-surface. An imaged free-surface profile is calculated by first computing up-going and down-going pressure components, or the up-going and down-going vertical velocity components, for each point of a series of depth levels that extend upward from the observation level to beyond the geoid or z=0 axis 910. FIG. 10A shows an example of a series of points represented by a column of open circles 1002 that extend from the point ($k_x$, $z^{obs}$) 921 on the observation level $z^{obs}$ 918 to beyond the z=0 axis 910. Each open circle in the series 1002 represents a point with coordinates ($k_x$, z), where the $k_x$-coordinate is the same for each point and the z-coordinates are increased incrementally in a process called extrapolation. The up-going pressure wavefield is calculated at each point in the series 1002 by:

$$P^{up}(k_x,z,\omega)=P^{up}(k_x,z^{obs},\omega)e^{jk_z(z^{obs}-z)} \quad (9a)$$

where z is a coordinate value in the series of points 1002. The down-going pressure wavefield is calculated at each point in the series 1002 by:

$$P^{down}(k_x,z,\omega)=P^{down}(k_x,z^{obs},\omega)e^{-jk_z(z^{obs}-z)} \quad (9b)$$

In another embodiment, the up-going vertical velocity component at each point in the series 1002 is calculated by:

$$V_z^{up}(k_x,z,\omega)=V_z^{up}(k_x,z^{obs},\omega)e^{jk_z(z^{obs}-z)} \quad (10a)$$

The down-going vertical velocity component at each point in the series 1002 is calculated by:

$$V_z^{down}(k_x,z,\omega)=V_z^{down}(k_x,z^{obs},\omega)e^{-jk_z(z^{obs}-z)} \quad (10b)$$

After the extrapolated up-going and down-going pressure components, or the extrapolated up-going and down-going vertical velocity components, have been calculated in the wavenumber-frequency domain, an inverse Fourier transform is used to transform the extrapolated up-going and down-going pressure components and/or extrapolated up-going and down-going vertical velocity components into the space-frequency domain. FIG. 10B shows a series of points 1010 in the space-frequency domain described above with reference to FIGS. 9A-9B. An inverse Fourier transform is used to transform the pressure and vertical velocity components associated with the points in the series 1002 in FIG. 10A to obtain corresponding pressure and vertical velocity components of the points 1010 in FIG. 10B. The pressure wavefields transformed to the space-frequency domain are given by:

$$P^{up}(x_r, z, \omega) = \frac{1}{2\pi}\int_{-\infty}^{\infty} dk_x P^{up}(k_x, z, \omega)e^{jk_x x_r} \quad (11a)$$

$$P^{down}(x_r, z, \omega) = \frac{1}{2\pi}\int_{-\infty}^{\infty} dk_x P^{down}(k_x, z, \omega)e^{jk_x x_r} \quad (11b)$$

The vertical velocity wavefields transformed to the space-frequency domain are given by:

$$V_z^{up}(x_r, z, \omega) = \frac{1}{2\pi}\int_{-\infty}^{\infty} dk_x V_z^{up}(k_x, z, \omega)e^{jk_x x_r} \quad (12a)$$

$$V_z^{down}(x_r, z, \omega) = \frac{1}{2\pi}\int_{-\infty}^{\infty} dk_x V_z^{down}(k_x, z, \omega)e^{jk_x x_r} \quad (12b)$$

For example, an inverse Fourier transform can be used to transform the up-going and down-going pressure and vertical velocity components 1005-1008 associated with the point ($k_x$, z) 1004, shown in FIG. 10A, into down-going pressure component $P^{down}(x_r, z, \omega)$ 1013, an up-going pressure component $P^{up}(x_r, z, \omega)$ 1014, a down-going vertical velocity component $v_z^{down}(x_r, z, \omega)$ 1015 and an up-going vertical velocity component $V_z^{up}(x_r, z, \omega)$ 1016 at a corresponding point ($x_r$, z) 1018 in the series 1010 shown in FIG. 10B. In practice, the transformations represented by Equations 11a-11b and 12a-12b can be carried out using a discrete Inverse Fast-Fourier Transform ("IFFT") for computational efficiency.

An imaging condition is used to calculate an image value I($x_r$, z) at each point in the series of points in the space-frequency domain. For example in FIG. 10C, an imaging condition is applied to each point in the series of points 1010 to obtain an image value, such as an image value I($x_r$, z) associated with the point ($x_r$, z) 1018. The imaging condition can be a cross correlation of the extrapolated up-going and down-going pressure, or vertical velocity, components in the space-frequency domain. In one embodiment, the imaging condition that represents a free-surface image value for a selected receiver position x and extrapolation depth z is calculated by applying the following cross-correlation equation:

$$I(x_r, z) = \sum_\omega D(x_r, z, \omega)\overline{U(x_r, z, \omega)} \quad (13)$$

where the overbar designates complex conjugation. In one embodiment, $D(x_r, z, \omega)$ represents $P^{down}(x_r, z, \omega)$ and $U(x_r, z, \omega)$ represents $P^{up}(x_r, z, \omega)$. In another embodiment, $D(x_r, z, \omega)$ represents $V_z^{down}(x_r, z, \omega)$ and $U(x_r, z, \omega)$ represents $V_z^{up}(x_r, z, \omega)$. In other embodiments, the imaging condition can be a normalized cross-correlation given by:

$$I(x_r, z) = \frac{\sum_\omega U(x_r, z, \omega)\overline{D(x_r, z, \omega)}}{\sum_\omega U(x_r, z, \omega)\overline{U(x_r, z, \omega)}} \quad (14)$$

The z-coordinate value or extrapolation depth associated with the maximum image value $I_{max}(x_r, z)$ for a given channel position x corresponds to a free-surface elevation z at the receiver position x. In the example of FIG. 10C, points in the series 1010 associated with the receiver 908 are represented as dashed-line open circles except for the point 1022 which corresponds to a point $(x_r, z_0)$ that yields a maximum cross-correlation $I_{max}(x_r, z_0)$. As a result, the point $(x_r, z_0)$ is an image point of a free-surface profile. Embodiments are not limited to the imaging conditions described above. Other types of imaging conditions can also be used. Other image points represented by open circles, such as open circles 1024, are calculated in the same manner by applying the same imaging condition to each point in a series of points as described above. Interpolation over the collection of image points forms a time stationary approximate image of the free-surface profile above the streamer 908 corresponding to a selected time window of the input data. For example, in FIG. 10C a curve 1026 is an imaged free-surface profile of the hypothetical free-surface profile represented by dotted curve 1028 in a selected time window. An imaged free-surface profile above a streamer can be interpolated using spline interpolation, Lagrange interpolation, polynomial interpolation, or another suitable interpolation technique. In other embodiments, the image points associated with two or more streamers can be used to calculate an approximate three-dimensional free surface above the streamers using multi-dimensional interpolation techniques, such as Barnes interpolation, Bezier interpolation, bicubic interpolation, and bilinear interpolation. Points along the image free-surface profile 1026 are represented by $[x, f(x)]$, where x represents a horizontal coordinate along the x-axis 904 and $f(x)$ is the interpolated function value that represents the free-surface height. A time-varying, free-surface estimation is obtained by continuously moving the input data time window and combining the computed "frozen" free-surface profiles for all the time windows from a start recording time to an end recording time.

Figure 11:
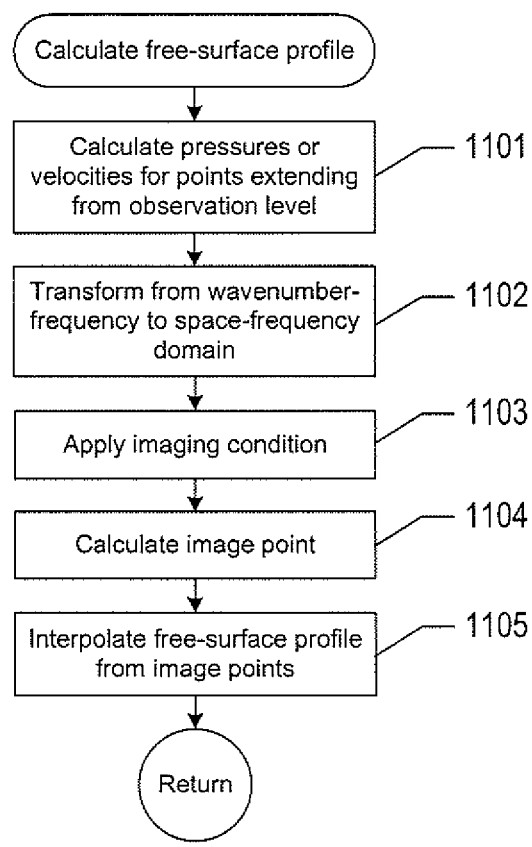
FIG. 11 shows a control-flow diagram of a computational method for calculating a free-surface profile.

FIG. 11 shows a control-flow diagram of a computational method for calculating the free-surface profile of block 604. In block 1101, up-going and down-going pressures and vertical velocities are calculated for points in the wavenumber-frequency domain, as described above with reference to FIG. 10A. In block 1102, the pressures and vertical velocities associated with the points are transformed from the wavenumber-frequency domain to the space-frequency domain. In block 1103, an imaging condition is applied as described above with reference to FIG. 10C. In block 1104, the point associated with the maximum imaging condition for a given receiver channel is calculated, as described above with reference to FIG. 10C. In block 1105, the image points associated with a streamer are used to calculate a "frozen" image profile of the free-surface.

Extending the Free-Surface Profile

Figure 12A:
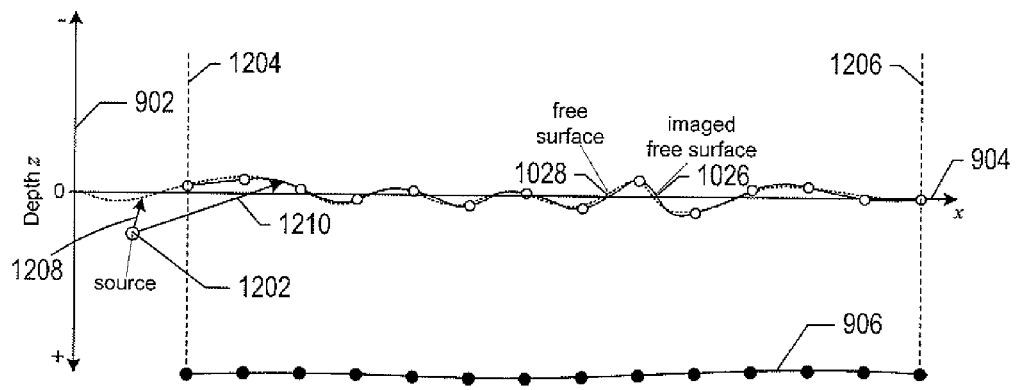
FIG. 12A shows a plot of a hypothetical free surface and an imaged free-surface profile that approximates the free surface.

Returning to FIG. 6, in block 605, the free-surface profile is extended to cover the source location. FIG. 12A shows a plot of a hypothetical free surface represented by dashed curve 1028 and the imaged free-surface profile 1026 that approximates the free surface 1028 above the streamer 906. Circle 1202 represents the coordinate location of a source towed by an exploration-seismology vessel (not shown). As shown in FIG. 12A, and in FIGS. 5, 7B and 8 described above, the source 1202 is not located over the streamers but is instead located between the vessel and the streamers. Because the imaged free-surface profile 1026 is computed from subsurface reflections, the imaged free-surface profile 1026 is limited to the streamer spread as indicated by dashed lines 1204 and 1206. As a result, the imaged free-surface profile 1026 does not cover the source 1202 and can only be used to deghost ghosts that are reflected from the free surface directly above the streamer and cannot be used to deghost ghosts that are reflected from the free surface above the source 1202. For example, directional arrows 1208 and 1210 represent two sound impulse paths output from the source 1208 and 1210. Both paths result in ghosted direct down-going wavefields and source ghost reflections as described above with reference to FIG. 5. The computation of the direct down-going wavefield including its ghost are used for low frequency vertical velocity wavefield reconstruction and deghosting of seismic data with sources above the streamer level. The imaged free surface 1026 can be used to deghost seismic data with ghosts that follow the path 1210, but because the imaged free surface 1026 does not extend to cover the region above the source 1202, the image free surface 1026 cannot be used to deghost seismic data that follows the path 1208.

Figure 12B:
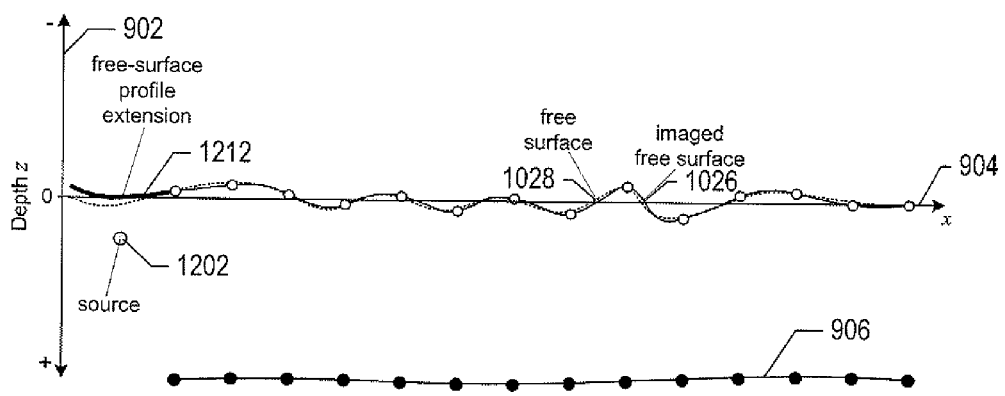
FIG. 12B shows a plot of a hypothetical free surface and an extended imaged free-surface profile that approximates the free surface.

In order to account for ghosts associated with reflections from the free surface above the source, the imaged free-surface profile is extended by calculating a free-surface profile extension of the imaged free-surface profile that covers the region above the coordinate location of the source. FIG. 12B shows a plot of the hypothetical free surface 1028 and an extended imaged free-surface profile. The extended imaged free-surface profile is the image free surface 1026 extended to include a free-surface profile extension 1212. The free-surface profile extension 1212 can be calculated based on parameters associated with a realistic physical model of a fully developed sea state determined at the time the seismic data is measured. For example, a realistic physical model can be a Pierson-Moskowitz model that provides parameters such as wavelength, wave-heights, and the velocity of the free surface waves. The Pierson-Moskowitz model of the free surface can be used to calculate the free-surface profile extension 1212 that covers the source 1202.

The Pierson-Moskowitz model assumes that when the wind blows steadily for a long period of time over a large area, the waves eventually reach a state of equilibrium with the wind. This condition is referred to as a "fully developed sea." The Pierson-Moskowitz spatial roughness spectrum for a fully developed sea in one-dimension is given by:

$$W(K) = \left[\frac{\alpha}{4|K|^3}\right]\exp(-\beta g^2/K^2 U_w^4) \quad (15)$$

where K is the free surface-wave spatial wavenumber;
$U_w$ is the wind speed measured at a height of about 19 meters;
$\alpha$ is $8.0 \times 10^{-3}$;
$\beta$ is 0.74; and
g is the acceleration due to gravity.

The free-surface height function $f(x)$ is generated at a point x as follows:

$$f(x) = \frac{1}{L}\sum_{i=0}^{N-1} F(K_i)e^{jK_i x} \quad (16)$$

where for the index i≥0, $$F(K_i) = \sqrt{2\pi LW(K_i)} \begin{cases} [N(0,1) + jN(0,1)]/\sqrt{2} & \text{for } i \neq 0, N/2 \\ N(0,1) & \text{for } i = 0, N/2 \end{cases} \quad (17)$$

and for i<0, $F(K_i)=F(K_{-i})^*$.

In Equations (16) and (17), the spatial wavenumber for component i is given by $K_i=2\pi i/L$, where L is the length of free surface. The random number N(0,1) can be generated from a Gaussian distribution having zero mean and a unit variance. As a result, the free surface is formed by adding each wavenumber component imposing random phase shifts. A frozen in time Pierson-Moskowitz free surface can be computed from Equation (16) using a fast Fourier Transform for computational efficiency.

Free-surface waves are dispersive and in deep water, the frequency and wavenumber are related by a dispersion relation given by:

$$\Omega(K_i)=\sqrt{gK_i} \quad (18)$$

Equation (18) implies that each spatial harmonic component of the surface may move with a definite phase velocity. As a result, in general, free surface waves of longer wavelengths travel faster relative to waves with shorter wavelengths. Combining Equations (16) and (18) gives a time-varying Pierson-Moskowitz free surface:

$$f(x,t) = \frac{1}{L}\sum_{i=0}^{N-1} F(K_i)e^{j(K_i x - \Omega(K_i)t)} \quad (19)$$

where t is the instantaneous time. Equation (19) characterizes a one-dimensional rough free surface moving in the positive x-direction and can be used to compute the free-surface extension at earlier or later time instances.

In general, a frozen free-surface for earlier or later times can be computed as follows. Consider a free surface shape at an instant in time t with wave heights given by $f(x,t)$, the wavenumber spectrum $F(K_i)$ of the free-surface is computed and an arbitrary known dispersion relation $\Omega(K_i)$ can be used to calculate the frozen free surface at earlier (t−Δt) or later (t+Δt) instances of time by:

$$f(\vec{x},t) = \frac{1}{L}\sum_{i=0}^{N-1} F(K_i)e^{j(K_i x - \Omega(K_i)\Delta t)} \quad (20)$$

Computing Free-Surface Wavefield Reflectivity

Figure 13:
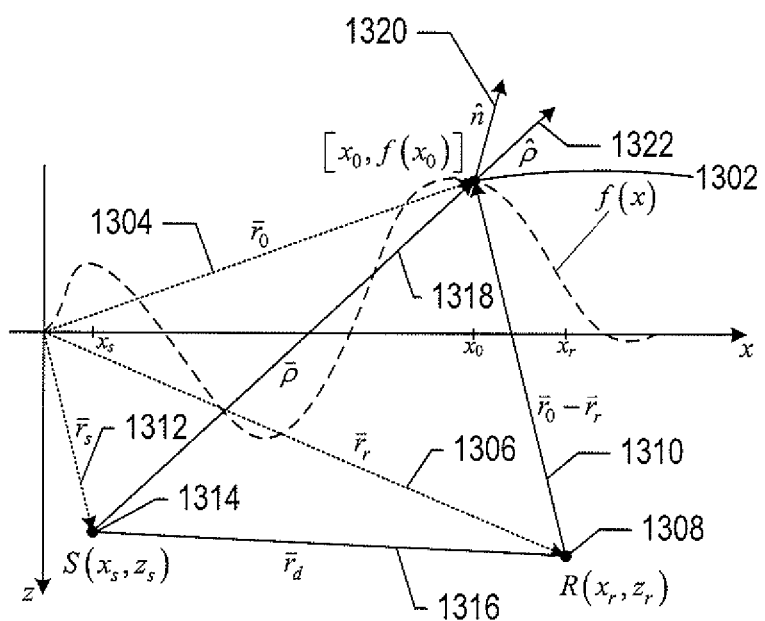
FIG. 13 shows parameters of an equation representing free-surface wavefield reflectivity.

Returning to FIG. 6, in block 606 the free-surface wavefield reflectivity (i.e., the response of a unit point source at the receiver position $\vec{r}_r$) can be computed over the extended free-surface using:

$$R(\vec{r}_r, \vec{r}_s) = \frac{1}{4j}H_0^{(1)}(k|\vec{r}_d|) + \frac{k}{8}\int_{S_r} H_0^{(1)}(k|\vec{r}_0 - \vec{r}_r|)H_1^{(1)}(k|\vec{\rho}|)\eta(x')\,dx' \quad (21)$$

with $$\eta(x') = \frac{-(x'-x_s)\frac{df(x)}{dx}\Big|_{x=x'}}{|\vec{\rho}|} + \frac{[f(x')-z_s]}{|\vec{\rho}|}$$

where $$H_n^{(1)}(x) \cong \sqrt{\frac{2}{\pi x}} \exp\left(j\left(x - \frac{\pi}{4} - \frac{n\pi}{2}\right)\right)$$

is the asymptotic form of the first-order Hankel function with n=0 and 1. The parameters of Equation (21) are represented in FIG. 13 as follows:

k is the wavenumber of the propagating wavefield;
$f(x)$ is the free-surface height described above;
[$x_0$, $f(x_0)$] is a coordinate position 1302 of a running scattering point on the surface;
$\vec{r}_0$ is a vector 1304 from the origin to the running scattering point 1302;
$\vec{r}_r$ is a vector 1306 from the origin to a fixed receiver position 1308 with spatial coordinates ($x_r$, $y_r$, $z_r$);
$\vec{r}_0 - \vec{r}_r$ is a vector 1310 from the running scattering point 1302 to the receiver position 1408;
$\vec{r}_s$ is a vector 1312 from the origin to a source position 1314;
$\vec{r}_d$ is a vector 1316 from the source position 1314 to the receiver 1308;
$\vec{\rho}$ is a vector 1318 from the source 1314 to the scattering point 1302; and
$\eta(x')=\hat{n}\cdot\hat{\rho}=\cos\theta$ is the obliquity factor with normal vectors $\hat{n}$ 1320 and $\hat{\rho}$ 1322 corresponding to the free surface normal and the unit vector direction of the incident field at [$x_0$, $f(x_0)$] 1302 and θ is the angle between the vectors $\hat{n}$ 1320 and $\hat{\rho}$ 1322.

The pressure wavefield $P(\vec{r}_r, \omega)$ over the entire frequency range can be obtained from pressure measurements at the pressure sensors. However, as explained above with reference to FIG. 4C, the recorded particle motion signal may be contaminated with low frequency noise due to vibrations of the towed streamers. As a result, particle motion signals recorded below the threshold frequency $\omega_{th}$ may not be useful for determining vertical velocity wavefields at receiver locations along the streamer below the threshold frequency $f_{th}$. Instead, only the vertical velocity wavefield $V_n^{th}(\vec{r}_r, \omega)$ obtained from particle motion measurements over a range of frequencies greater than $\omega_{th}$ are typically reliable. A vertical velocity wavefield for frequencies below the threshold frequency $\omega_{th}$, $V_n^{cal}(\vec{r}_r, \omega)$, can be calculated from the normal derivate of the pressure wavefield, $\vec{n}\cdot\nabla_r P$, in a process called "low frequency compensation." Wavefield decomposition can then be performed to calculate receiver deghosted pressure and velocity wavefields.

Computing Gradient of Pressure Wavefield

Figure 14A:
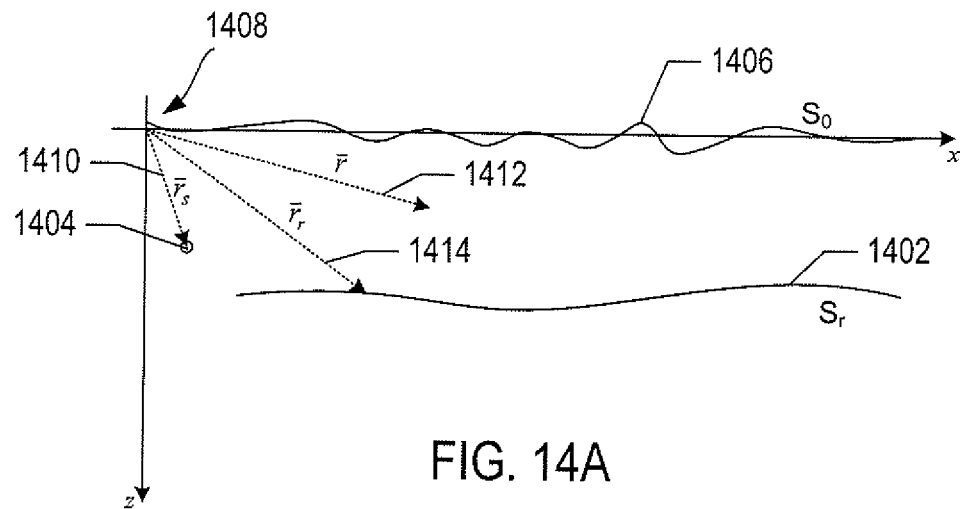
FIGS. 14A-14B show a two-dimensional view of an example model space associated with a fluid volume.
Figure 14B:
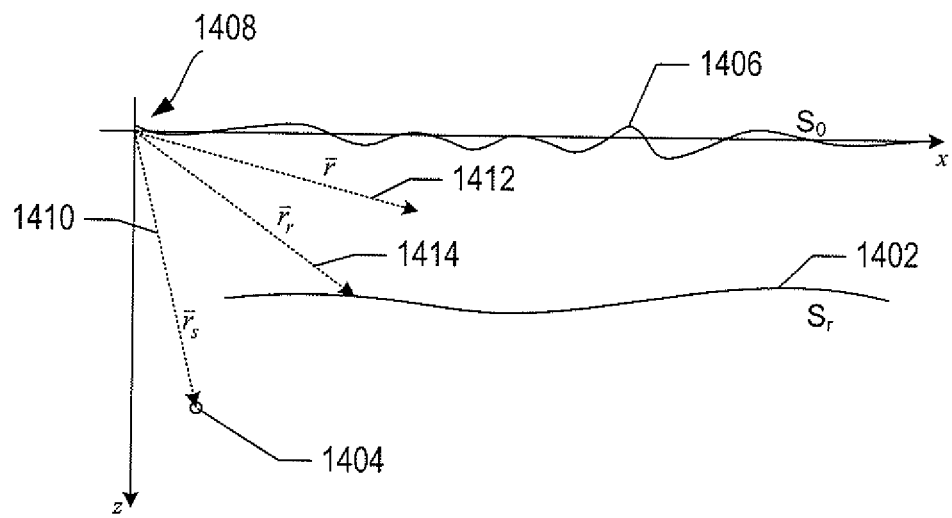

In block 607, the gradient of the pressure wavefield, $\nabla_r P$, is computed. Computation of the gradient of the pressure wavefield, $\nabla_r P$, is determined by whether the depth of the source is greater than or less than the depth of the streamer. FIGS. 14A-14B show two-dimensional xz-plane views of an example model space associated with a fluid volume. In FIGS. 14A-14B, the space includes a representation of a streamer 1402, denoted by $S_r$, a source 1404, that produces sound impulses. The streamer 1402 and the source 1404 can be towed by an exploration-seismology vessel (not shown) within the fluid volume below the free surface that can be imaged as described above to produce an imaged free-surface profile represented by curve 1406 and denoted by $S_0$. The imaged free-surface $S_0$ includes a free-surface profile extension 1408 above the source 1404. Vectors such as vector $\vec{r}_s$ 1410 represent source spatial coordinates ($x_s$, $y_s$), vectors such as vector $\vec{r}$ 1412 represent coordinates (x, y) in the fluid volume, and vectors such as vector $\vec{r}_r$ 1414 represent receiver coordinates ($x_r$, $z_r$) along the streamer 1402. When the depth of the source 1404 is less than the depth of the streamer, as shown in FIG. 14A, the expression used to calculate the gradient of the pressure wavefield over the entire frequency range is give by:

$$\int_{S_r} dS_r \vec{n} \cdot R(\vec{r}_r, \vec{r}) \nabla_r P(\vec{r}_r, \omega) = a(\omega) R(\vec{r}_s, \vec{r}) + \int_{S_r} dS_r \vec{n} \cdot P(\vec{r}_r, \omega) \nabla_r R(\vec{r}_r, \vec{r}) \quad (22)$$

where $\alpha(\omega)$ is the Fourier transform of the source-time function for the source at the coordinate location $\vec{r}_s$; and $R(\vec{r}, \vec{r}_s)$ is the free-surface wavefield reflectivity given by Equation (21).

In order to compute the free-surface wavefield reflectivity with a hypothetical source at $\vec{r}$ below the receiver surface and a hypothetical receiver position at $\vec{r}_s$ knowledge of an extended free surface profile is needed. Equation (22) is a Fredholm integral equation of the first kind for the gradient of the pressure wavefield $\nabla_r P(\vec{r}_r, \omega)$ where the right-hand side of Equation (22) contains only known parameters such as the field pressure wavefield $P(\vec{r}_r, \omega)$ and the free-surface wavefield reflectivity $R(\vec{r}_r, \vec{r})$. The free-surface wavefield reflectivity with a hypothetical source at r below the receiver surface and a hypothetical receiver at $\vec{r}_r$ is computed from the imaged free-surface profile. The gradient of the reflectivity, $\nabla_r R(\vec{r}_r, \vec{r})$, can be computed using numerical gradient techniques. On the other hand, when the source is located at a depth below the streamer $S_r$, as shown in FIG. 14B, the expression used to calculate the gradient of the pressure wavefield $\nabla_r P(\vec{r}_r, \omega)$ over the entire frequency range is give by:

$$\int_{S_r} dS_r \vec{n} \cdot R(\vec{r}_r, \vec{r}) \nabla_r P(\vec{r}_r, \omega) = \int_{S_r} dS_r \vec{n} \cdot P(\vec{r}_r, \omega) \nabla_r R(\vec{r}_r, \vec{r}) \quad (23)$$

In Equation (23), the source function $a(\omega)$ is not used to calculate $\nabla_r P(\vec{r}_r, \omega)$. Note that the solutions of Equations (22) and (23) become unstable when the spectrum of the pressure wavefield has very small values (e.g., close to receiver ghost notches). These spectral notches occur generally for typical towing depths at frequencies $\omega > \omega_{th}$. As a result, the gradient of the pressure wavefield can be computed for the frequencies below the threshold frequency $\omega_{th}$ for a time-varying, arbitrarily rough free-surface. A derivation of Equations (22) and (23) is provided in an APPENDIX below.

Depending on whether the source is at a depth above or below the streamer, as shown in FIGS. 14A and 14B, respectively, Equations (22) and (23) can be solved numerically for the gradient of the pressure wavefield, $\nabla_r P$, at receiver locations along the streamer using quadrature or expansion methods. For quadrature methods, the integrals are approximated by quadrature formulas and the resulting system of algebraic equations is solved. For expansion methods, the solution is approximated by an expansion in terms of basis functions.

Computing Normal Velocity Wavefield

Returning to FIG. 6, in block 608 the normal component of the vertical velocity wavefield below the threshold frequency $f_{th}$ at each receiver location along a streamer can be calculated by:

$$V_{\vec{n}}^{cal}(x_r, z_r, \omega) = -\frac{j}{\rho\omega} \vec{n} \cdot \nabla_r P(x_r, z_r, \omega) \quad (24)$$

where $\rho$ is the density of the fluid; and
$\vec{n}$ is a normal vector to a receiver.

Figure 15:
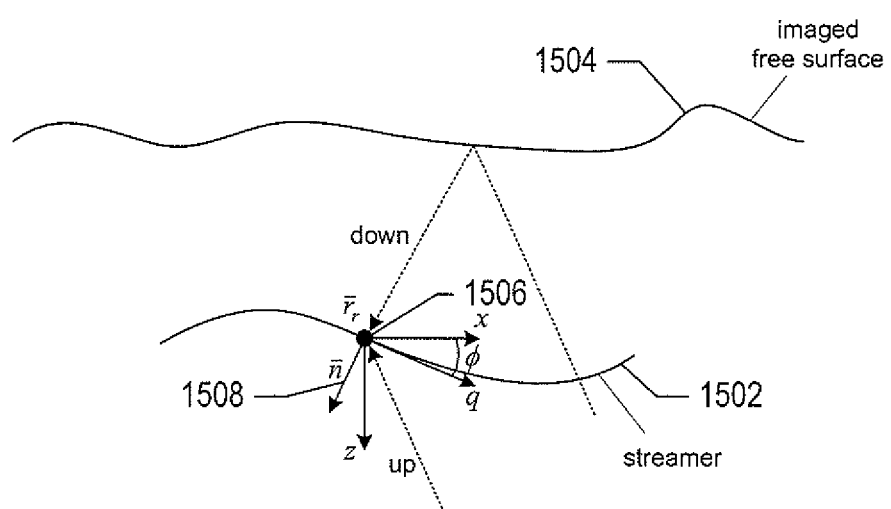
FIG. 15 shows a segment of a streamer located beneath an imaged free surface of a fluid volume.

FIG. 15 shows a segment of a streamer 1502 located beneath an imaged free surface 1604 in the xz-plane of a fluid volume. A normal vector 1508 to the streamer 1502 at the receiver 1506 is given by:

$$\vec{n} = (n_x, n_z) = (-\sin\phi, \cos\phi) = \left(-\frac{dz_r}{dq}, \frac{dx_r}{dq}\right)$$

where $\nabla_r P$ is the gradient of the pressure wavefield at the receiver 1606; and
$\vec{n} \cdot \nabla_r P$ is the normal derivative of the pressure wavefield P at the receiver 1606.

At this point the pressure wavefield $P(x_r, z_r, \omega)$ over the entire frequency range is known from pressure sensor measurements, the vertical velocity wavefield $V_{\vec{n}}^{th}(x_r, z_r, \omega)$ over a frequency range above the low frequency threshold $\omega_{th}$ is obtained from particle motion measurements and the vertical velocity wavefield below the threshold frequency $\omega_{th}$ is calculated from Equation (24). The vertical velocity wavefield $V_{\vec{n}}(x_r, z_r, \omega)$ over the entire frequency range can be calculated by:

$$V_{\vec{n}}(x_r, Z_r, \omega) = \quad (25)$$
$$\begin{cases} V_{\vec{n}}^{cal}(x_r, z_r, \omega) & \text{for } 0 \leq \omega \leq \omega_{th} \\ (1-w(\omega)) \; V_{\vec{n}}^{cal}(x_r, z_r, \omega) + w(\omega) V_{\vec{n}}^{th}(x_r, z_r, \omega) & \text{for } \omega_{th} < \omega \leq \omega_1 \\ V_{\vec{n}}^{th}(x_r, z_r, \omega) & \text{for } \omega_1 < \omega \end{cases}$$

where $w(\omega)$ is a weight function with the property that $w(\omega)=0$ when $\omega=\omega_{th}$ and $w(\omega)=1$ when $\omega=\omega_1$ to smoothly transition $V_{\vec{n}}$ from $V_{\vec{n}}^{cal}$ to $V_{\vec{n}}^{th}$ as $\omega$ increases from $\omega_{th}$ to $\omega_1$, and $\omega_1$ is less than $\pi c/z_r$ (i.e., $f_{th} < c/2z_r$) in order to maintain a good signal-to-noise ratio of the hydrophone signal.

For example, the weight function $w(\omega)$ can be a linear weight function given by:

$$w(\omega) = \frac{\omega - \omega_{th}}{\omega_1 - \omega_{th}} \text{ for } \omega_{th} < \omega \leq \omega_1$$

In other embodiments, other types of linear weight functions as well as non-linear weight functions can be used such as a harming weight function.

Computing Receiver Deghosted Wavefield

In block 609, the recorded pressure wavefield and the vertical velocity wavefield given by Equation (25) are used to calculate the receiver side deghosted pressure wavefield (i.e., the up-going pressure wavefield $P^{up}$) over the entire frequency range in the wavenumber-frequency domain using:

$$P^{up}(k_x, z = 0, \omega) = \qquad (26)$$

$$\frac{\Delta x}{-2jk_z} \sum_{m=0}^{M-1} \{ j\omega\rho V_n(m\Delta x, z_{r,m}, \omega) e^{(jk_x m\Delta x - jk_z z_{r,m})} +$$

$$P(m\Delta x, z_{r,m}, \omega) e^{(jk_x m\Delta x - jk_z z_{r,m})} (jk_x n_x - jk_z n_z) \}$$

The up-going pressure component at each receiver along the streamer is calculated from $P^{up}(k_x, z=0, \omega)$ by:

$$P^{up}(k_x, z_r, \omega) = P^{up}(k_x, z=0, \omega) e^{-jk_z z_r} \qquad (27)$$

and the deghosted vertical velocity wavefield at each receiver in the wavenumber-frequency domain is given by:

$$V_z^{up}(k_x, z_r, \omega) = -\frac{k_z}{\rho\omega} P^{up}(k_x, z_r, \omega) \qquad (28)$$

Note that the deghosted pressure wavefield $P^{up}(k_x, z_r, \omega)$ and the deghosted vertical velocity wavefield $V_z^{up}(k_x, z_r, \omega)$ are the up-going pressure and vertical velocity wavefields over the entire frequency range.

The deghosted pressure wavefield can then be transformed from the wavenumber-frequency domain into the space-frequency domain to obtain:

$$P^{up}(x_r, z_r, \omega) = \frac{1}{M} \sum_{m=0}^{M-1} P^{up}(k_x, z_r, \omega) e^{jx_r m \Delta k_x} \qquad (29)$$

followed by a transformation from the space-frequency domain to the space-time domain:

$$p^{up}(x_r, z_r, t) = \frac{1}{2\pi} \int_{-\infty}^{\infty} d\omega P^{up}(x_r, z_r, \omega) e^{j\omega t} \qquad (30)$$

Likewise, the deghosted vertical velocity wavefield can be transformed from the wavenumber-frequency domain to the space-frequency domain to obtain:

$$V_z^{up}(x_r, z_r, \omega) = \frac{1}{M} \sum_{m=0}^{M-1} V_z^{up}(k_x, z_r, \omega) e^{jx_r m \Delta k_x} \qquad (31)$$

followed by a transformation from the vertical velocity wavefield from the space-frequency domain to the space-time domain:

$$v_z^{up}(x_r, z_r, t) = \frac{1}{2\pi} \int_{-\infty}^{\infty} d\omega V_z^{up}(x_r, z_r, \omega) e^{j\omega t} \qquad (32)$$

The inverse Fourier transformations of Equations (29)-(32) can be carried out using inverse fast Fourier transformations for computational efficiency. In summary, the receiver deghosted, or up-going, wavefields $p^{up}$ and $v_z^{up}$ at the receivers are used to calculate images of the subterranean formations located beneath the fluid volume.

Figure 16:
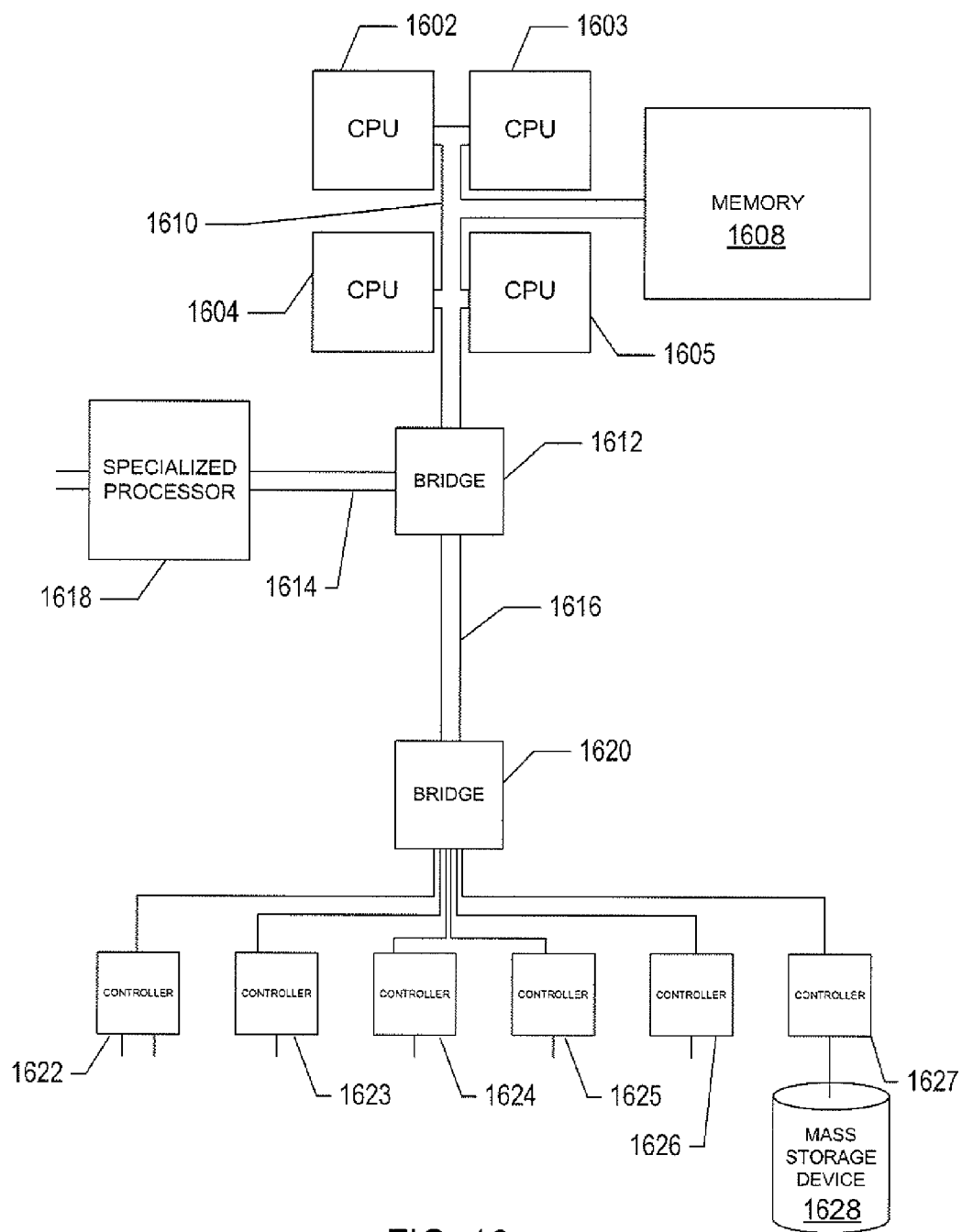
FIG. 16 shows one example of a generalized computer system that executes an efficient method for deghosting a scattered wavefield.

FIG. 16 shows one illustrative example of a generalized computer system that executes an efficient method for source deghosting a scattered wavefield and therefore represents a seismic-analysis data-processing system to which the description is directed. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1602-1605, one or more electronic memories 1608 interconnected with the CPUs by a CPU/memory-subsystem bus 1610 or multiple busses, a first bridge 1612 that interconnects the CPU/memory-subsystem bus 1610 with additional busses 1614 and 1616, or other types of high-speed interconnection media, including multiple, high-speed serial interconnects. These busses or serial interconnections, in turn, connect the CPUs and memory with specialized processors, such as a graphics processor 1618, and with one or more additional bridges 1620, which are interconnected with high-speed serial links or with multiple controllers 1622-1627, such as controller 1627, that provide access to various different types of computer-readable media, such as computer-readable medium 1628, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1628 is a data-storage device, including electronic memory, optical or magnetic disk drive, USB drive, flash memory and other such data-storage device. The computer-readable medium 1628 can be used to store machine-readable instructions associated with the source deghosting computational methods described above and can be used to store encoded data, during store operations, and from which encoded data can be retrieved, during read operations, by computer systems, data-storage systems, and peripheral devices.

APPENDIX

A derivation of integral equations that can be used to compute the gradient of the pressure wavefield at a receiver of a streamer, $\nabla_r P$, is described with reference to FIGS. 17A-17E (See also "Extraction of the normal component of the particle velocity from marine pressure data," L. Amundsen et al., *Geophysics*, Vol. 60, No. 1, pp 212-222 (January-February 1995)).

Figure 17A:
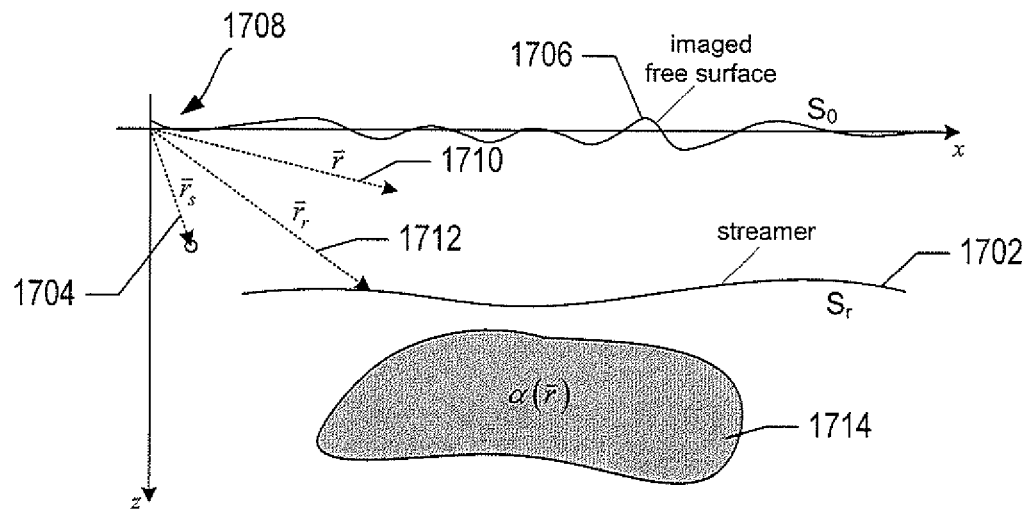
FIGS. 17A-17E show plots of a streamer and free surface.

FIG. 17A shows a two-dimensional xz-plane view of an example model space 1700 associated with a fluid volume. The space 1700 includes a representation of a streamer 1702, denoted by $S_r$, and a source 1704 that produces sound impulses. The streamer 1702 and the source 1704 can be towed by an exploration-seismology vessel (not shown) within the fluid volume below an imaged free-surface profile represented by curve 1706 and denoted by $S_0$. The imaged free-surface $S_0$ includes a free-surface profile extension 1708 above the source 1704. Vectors such as vector $\vec{r}_s$ 1704 represent the spatial coordinates $(x_s, y_s)$ of the source, vectors such as vector $\vec{r}$ 1710 represent coordinates $(x, y)$ in the space 1700, and vectors such as vector $\vec{r}_r$ 1712 represent receiver coordinates $(x_r, z_r)$ located along the streamer 1702. A shaded region 1714 in FIG. 17A, and in subsequent FIGS. 17B-17E, represents a scattering region beneath the streamer 1702. The speed of sound in the region 1714 is given by:

$$c(\vec{r}) = \frac{c_0}{\sqrt{1-\alpha(\vec{r})}} \quad (A-1)$$

where $c_0$ is the speed of sound in a fluid; and $0 \leq \alpha(\vec{r}) < 1$ is the index of refraction over the region 1714.

The pressure field generated by the source 1704 at the point 1710 is $p(\vec{r}, \vec{r}_s, t)$ and can be transformed from the space-time domain to the space-frequency domain using a Fourier transform to obtain a pressure wavefield $P(\vec{r}, \vec{r}_s, \omega)$ at the point 1710. In practice the transformation from the space-time domain to the space-frequency domain can be accomplished using a Fast-Fourier Transform for computational efficiency.

The constant-density acoustic wave equation that characterizes a pressure wavefield $P(\vec{r}, \vec{r}_s, \omega)$ caused by a single source that generates sound impulses, such as the source 1704, located at the spatial coordinates $\vec{r}_s$ is given by:

$$\left(\nabla^2 + \frac{\omega^2}{c^2(\vec{r})}\right) P(\vec{r}, \vec{r}_s, \omega) = a(\omega)\delta(\vec{r}-\vec{r}_s) \quad (A-2)$$

where $\nabla^2$ is the Laplacian;

$\omega$ is the angular frequency;

$\delta(\vec{r}-\vec{r}_s)$ is the three-dimensional Dirac delta function that represents the impulse of sound output from the source 1704; and $a(\omega)$ is the Fourier transform of the source-time function for the source at the coordinate location $\vec{r}_s$.

The acoustic wave Equation (A-2) characterizes the propagation of the acoustic pressure wavefield $P(\vec{r}, \vec{r}_s, \omega)$ in the fluid volume, where the acoustic pressure waves originate from the impulse sound source 1704. Substituting the Equation (A-1) for the speed of sound $c(\vec{r})$ into the acoustic wave Equation (A-2) and rearranging gives:

$$(\nabla^2 + k_0^2) P(\vec{r}, \vec{r}_s, \omega) = k_0^2 \alpha(\vec{r}) P(\vec{r}, \vec{r}_s, \omega) + a(\omega)\delta(\vec{r}-\vec{r}_s) \quad (A-3)$$

Figure 17B:
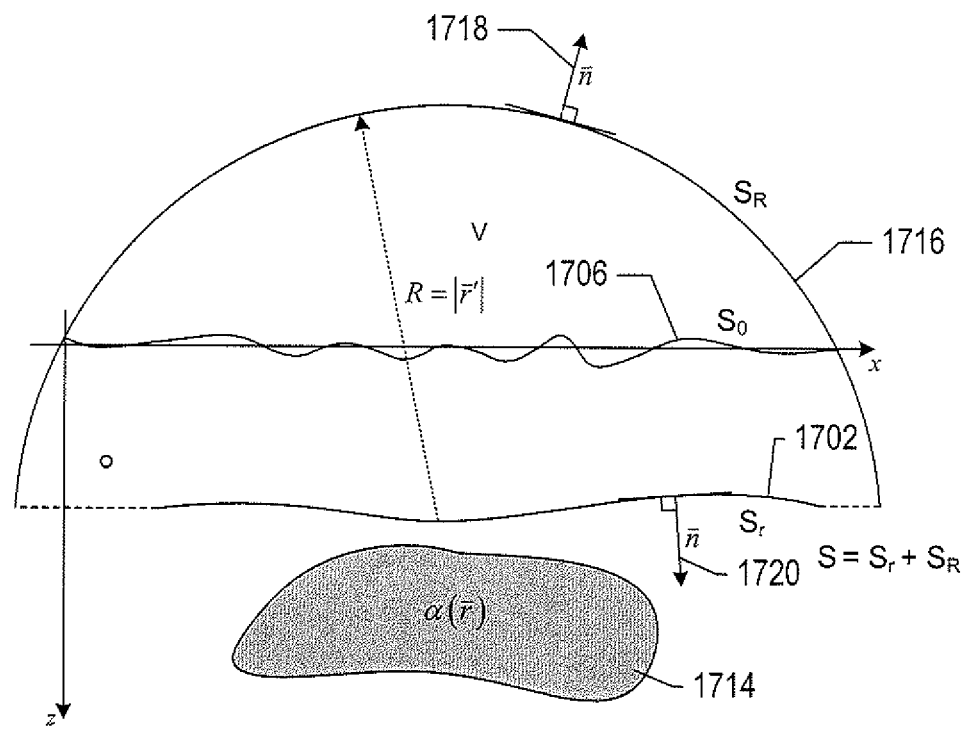

Now consider Green's second identity from vector calculus:

$$\int_V dr[B\nabla^2 C - C\nabla^2 B] = \int_S d\vec{S}\vec{n} \cdot [B\nabla C - C\nabla B] \quad (A-4)$$

where B and C are both twice differentiable scalar fields in a volume V bounded by a closed surface S with an outward pointing vector $\vec{n}$. FIG. 17B shows a volume V in the space 1700. The volume V lies within a closed surface S, which is the streamer surface $S_r$ 1702 and a hemispherical cap $S_R$ 1716 of radius $R = |\vec{r}'|$. The volume V encloses the imaged free surface $S_0$ but does not include the scattering region 1714. FIG. 17B shows two examples of outward normal vectors $\vec{n}$ 1718 and 1720. An integral equation for the pressure wavefield, P, and the gradient of the pressure wavefield, $\nabla P$, can be obtained by setting B=P and $C=G_{k_0}$ in Green's second identity (A-4) to give:

$$\int_V d\vec{r}' [P(\vec{r}',\omega)\nabla'^2 G_{k_0}(\vec{r}',\vec{r}) - G_{k_0}(\vec{r}',\vec{r})\nabla'^2 P(\vec{r}',\omega)] = \quad (A-5)$$
$$\int_S dS\vec{n} \cdot [P(\vec{r}',\omega)\nabla' G_{k_0}(\vec{r}',\vec{r}) - G_{k_0}(\vec{r}',\vec{r})\nabla' P(\vec{r}',\omega)]$$

where $\vec{r}'$ is restricted to points within the volume V. The Green's function $G_{k_0}(\vec{r}',\vec{r})$ characterizes reflections from the free surface and is a solution of the acoustic wave equation (21) for a unit impulse source within V and is given by:

$$(\nabla^2 + k_0^2) G_{k_0}(\vec{r}',\vec{r}) = \delta(\vec{r}'-\vec{r}) \quad (A-6)$$

where $k_0 = \omega/c_0$; and $\vec{r}'$ represents a point in the space 1700 and $\vec{r}$ the source location of the Green's function.

For example, the reflectivity $R(\vec{r}',\vec{r})$ given by Equation (17) can be used as the Green's function $G_{k_0}(\vec{r}',\vec{r})$ in Equations (A-5) and (A-6) (i.e., $G_{k_0}(\vec{r}',\vec{r}) = R(\vec{r}',\vec{r})$). Substituting the Equations (A-3) and (A-6) into Equation (A-5) gives:

$$\int_V d\vec{r}' [P(\vec{r}', \vec{r}_s, \omega)\delta(\vec{r}',\vec{r}) - \quad (A-7)$$
$$G_{k_0}(\vec{r}',\vec{r})a(\omega)\delta(\vec{r}'-\vec{r}_s) - G_{k_0}(\vec{r}',\vec{r})k_0^2\alpha(\vec{r}')P(\vec{r}',\vec{r}_s,\omega)] =$$
$$\int_S dS\vec{n} \cdot [P(\vec{r}',\vec{r}_s,\omega)\nabla' G_{k_0}(\vec{r}',\vec{r}) - G_{k_0}(\vec{r}',\vec{r})\nabla' P(\vec{r}',\vec{r}_s,\omega)]$$

Figure 17C:
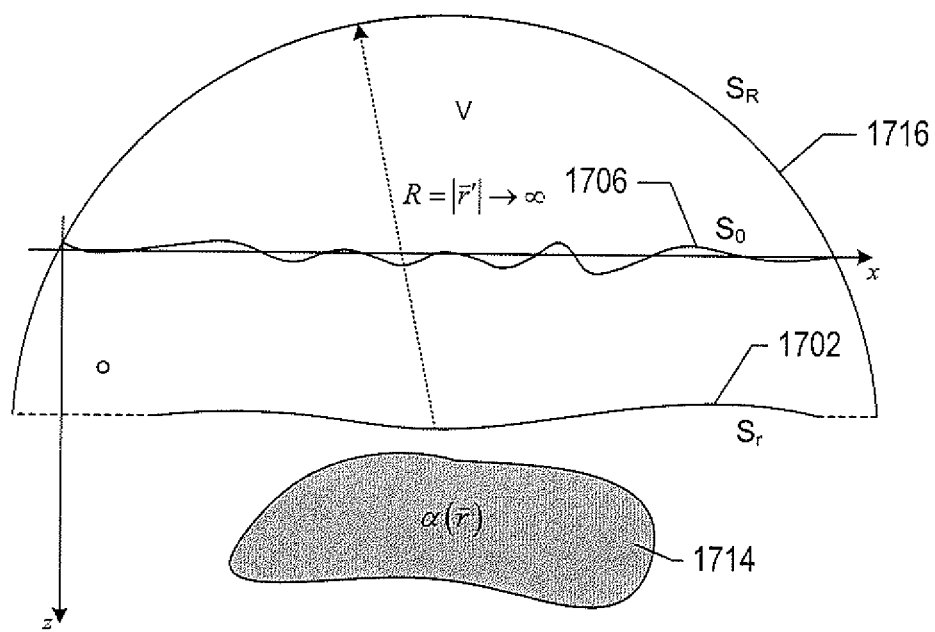
Figure 17D:
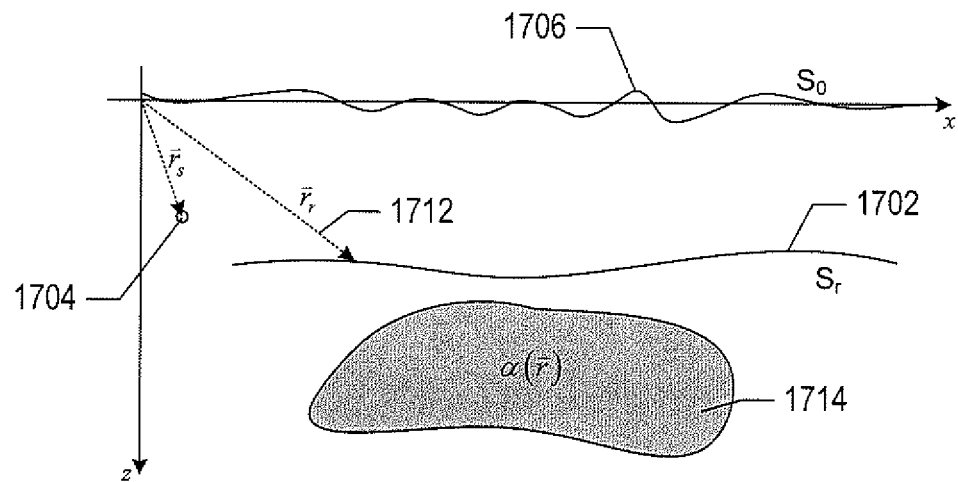

By letting the radius R of the hemispherical cap $S_R$ go to infinity, $S_R$ approaches an infinite hemispherical shell, as shown in FIG. 17C. The surface integral over the surface S in Equation (A-7) reduces to an integral equation over the streamer surface $S_r$. In addition, the first term in Equation (A-7) goes to zero when the source of the reflectivity represented by the Green's function is outside the volume V. Because the scattering region $\alpha$ 1714 is located outside the volume V, the third term in Equation (A-7) also goes to zero leaving:

$$-a(\omega)\int_V d\vec{r}' G_{k_0}(\vec{r}',\vec{r})\delta(\vec{r}'-\vec{r}_s) = \quad (A-8)$$
$$\int_{S_r} dS_r \vec{n} \cdot \begin{bmatrix} P(\vec{r}_r, \vec{r}_s, \omega)\nabla_r G_{k_0}(\vec{r}_r,\vec{r}) - \\ G_{k_0}(\vec{r}_r,\vec{r})\nabla_r P(\vec{r}_r, \vec{r}_s, \omega) \end{bmatrix}$$

Equation (A-8) represents a functional relationship between the pressure wavefield $P(\vec{r}_r, \omega)$, which is obtained from measurements taken at pressure sensors along the streamer $S_r$, and the gradient of the pressure wavefield $\nabla_r P(\vec{r}_r, \omega)$ at the pressure sensors along the streamer $S_r$. This functional relationship between the pressure wavefield and the gradient of the pressure wavefield given by Equation (A-8) can be used to compute the gradient of the pressure wavefield $\nabla_r P(\vec{r}_r, \omega)$ when only the pressure wavefield $P(\vec{r}_r, \omega)$ is known.

Equation (A-8) can also be applied to address two cases in which the source 1704 lies above the level of the streamer 1702 or lies below the level of the streamer 1702. When the source 1704 is located within the volume V at a depth between the free surface and the receiver surface as shown in the example representation of FIG. 17D, according to the shifting property associated with the Dirac delta function the integral over the volume V in the left-hand side of Equation (A-8) reduces to:

$$a(\omega)G_{k_0}(\vec{r}_s, \vec{r}) = -\int_{S_r} dS_r \vec{n} \cdot [P(\vec{r}_r, \omega)\nabla_r G_{k_0}(\vec{r}_r, \vec{r}) - G_{k_0}(\vec{r}_r, \vec{r})\nabla_r P(\vec{r}_r, \omega)] \quad (A-9)$$

The terms of Equation (A-9) can be rearranged to give:

$$\int_{S_r} dS_r \vec{n} \cdot G_{k_0}(\vec{r}_r, \vec{r})\nabla_r P(\vec{r}_r, \omega) = \quad (A-10)$$

$$a(\omega)G_{k_0}(\vec{r}_s, \vec{r}) + \int_{S_r} dS_r \vec{n} \cdot P(\vec{r}_r, \omega)\nabla_r G_{k_0}(\vec{r}_r, \vec{r})$$

Figure 17E:
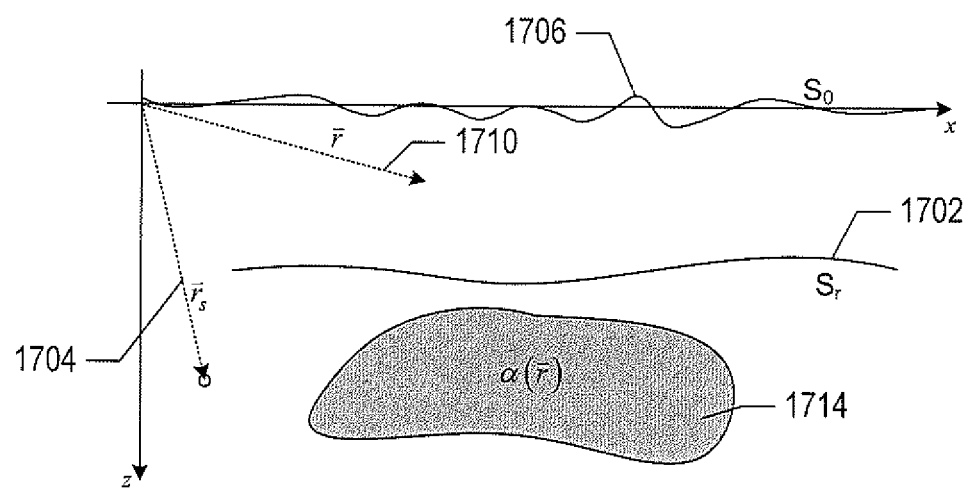

Equation (A-10) is a Fredholm integral equation of the first kind for the gradient of the pressure wavefield $\nabla_r P(\vec{r}_r, \omega)$ where the right-hand side of Equation (A-10) contains only known parameters such as the field pressure wavefield $P(\vec{r}_r, \omega)$ and the Green's function $G_{k_0}(\vec{r}, \vec{r}_r)$ described above. On the other hand, when the source is located outside the volume V at a depth below the streamer $S_r$, as shown in FIG. 17E, Equation (A-7) reduces to $$\int_{S_r} dS_r \vec{n} \cdot G_{k_0}(\vec{r}_r, \vec{r})\nabla_r P(\vec{r}_r, \omega) = \int_{S_r} dS_r \vec{n} \cdot P(\vec{r}_r, \omega)\nabla_r G_{k_0}(\vec{r}_r, \vec{r}) \quad (A-11)$$

for the gradient of the pressure $\nabla_r P(\vec{r}_r, \omega)$. In Equation (A-11), the source function $a(\omega)$ is not used to determine $\nabla_r P(\vec{r}_r, \omega)$.

Although the present invention has been described in terms of particular embodiments, it is not intended that the invention be limited to these embodiments. Modifications within the spirit of the invention will be apparent to those skilled in the art. For example, any number of different computational-processing-method implementations that carry out efficient source and receiver deghosting may be designed and developed using various different programming languages and computer platforms and by varying different implementation parameters, including control structures, variables, data structures, modular organization, and other such parameters. The computational representations of wavefields, operators, and other computational objects may be implemented in different ways. Although the efficient wavefield extrapolation method discussed above can be carried out on a single two-dimensional sampling, source and receiver deghosting can be carried out using multiple two-dimensional samplings or three-dimensional sampling obtained experimentally for different depths, can be carried out from greater depths to shallower depths, and can be applied in many other contexts.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method to determine structural information about a subterranean formation to be carried out by a computer system that includes one or more processors and one or more data-storage devices, the method comprising:
   computing vertical velocity wavefields associated with marine seismic receivers based on reflectivity of a time-varying, rough free surface profile above the marine seismic receivers and for frequencies below a threshold frequency using pressure wavefields measured at the receivers;
   computing receiver deghosted wavefields based on the measured pressure wavefields, vertical velocity wavefields measured at the receivers above the threshold frequency, and the computed vertical velocity wavefields; and
   generating an image of the subterranean formation using at least in part the receiver deghosted wavefields, the image revealing structural information about the subterranean formation.

2. The method of claim 1, wherein computing the vertical velocity wavefields further comprises:
   decomposing the measured wavefields into up-going and down-going wavefields;
   computing a free-surface profile image of the free-surface as a function of the up-going and down-going wavefields;
   computing a free-surface profile extension of the free-surface profile assuming a frozen free surface and using a spatial roughness spectrum of the free surface; and
   computing free-surface wavefield reflectivity for the free-surface profile and the free-surface profile extension.

3. The method of claim 2, further comprising:
   computing a gradient of the pressure wavefield at receiver coordinate locations below the threshold frequency using the free-surface wavefield reflectivity; and
   computing the vertical velocity wavefield below the threshold frequency as a function of the gradient of the pressure wavefield at the receiver coordinate locations.

4. The method of claim 2, wherein decomposing the measured wavefields into up-going and down-going wavefields farther comprises decomposing the measured pressure wavefields into up-going and down-going pressure wavefields and decomposing the measured vertical velocity wavefields into up-going and down-going vertical velocity wavefields.

5. The method of claim 1, wherein computing the receiver deghosted wavefields further comprises computing receiver deghosted pressure wavefields as a function of the measured vertical velocity wavefields and the computed vertical velocity wavefields below the threshold frequency, and computing receiver deghosted vertical velocity wavefields as a function of the deghosted pressure wavefields.

6. The method of claim 1, wherein marine seismic receivers form a data acquisition surface.

7. The method of claim 1, wherein the threshold frequency is a highest frequency of a frequency range over which measured vertical velocity wavefields have a low signal-to-noise ratio.

8. A computer system to determine structural information about a subterranean formation, the computer system comprising:
 one or more processors;
 one or more data-storage devices; and
 a deghosting routine stored in one or more of the one or more data-storage devices and executed by the one or more processors, the routine directed to
  retrieving from the one or more data-storage devices pressure wavefield data measured at marine seismic receivers over a frequency range and vertical velocity wavefields measured at the receivers above a threshold frequency of the frequency range;
  computing vertical velocity wavefields associated with marine seismic receivers for frequencies below the threshold frequency using the measured pressure wavefields and reflectivity of a time-varying rough free surface profile above the marine streamer;
  computing receiver deghosted wavefields over the frequency range based on the measured pressure wavefields, the measured vertical velocity wavefields above the threshold frequency, and the computed vertical velocity wavefields; and
  generating an image of the subterranean formation using at least in part the receiver deghosted wavefields, the image revealing structural information about the subterranean formation.

9. The computer system of claim 8, wherein computing the vertical velocity wavefields for frequencies below the threshold frequency further comprises:
 decomposing the measured wavefields into up-going and down-going wavefields;
 computing a free-surface profile image of the free-surface as a function of the up-going and down-going wavefields;
 computing a free-surface profile extension of the free-surface profile assuming a frozen free surface and using a spatial roughness spectrum of the free surface; and
 computing free-surface wavefield reflectivity for the free-surface profile and the free-surface profile extension.

10. The computer system of claim 9, further comprising:
 computing a gradient of the pressure wavefield at receiver coordinate locations below the threshold frequency using the free-surface wavefield reflectivity; and
 computing the vertical velocity wavefield associated with the receivers for frequencies below the threshold frequency as a function of the gradient of the pressure wavefield at the receiver coordinate locations.

11. The computer system of claim 9, wherein decomposing the measured wavefields into up-going and down-going wavefields further comprises decomposing the measured pressure wavefields into up-going and down-going pressure wavefields and decomposing the measured vertical velocity wavefields into up-going and down-going vertical velocity wavefields.

12. The computer system of claim 8, wherein computing the receiver deghosted wavefields further comprises computing receiver deghosted pressure wavefields as a function of the measured vertical velocity wavefields and the computed vertical velocity wavefields below the threshold frequency, and computing receiver deghosted vertical velocity wavefields as a function of the deghosted pressure wavefields.

13. The computer system of claim 8, wherein marine seismic receivers form a data acquisition surface.

14. The computer system of claim 8, wherein the threshold frequency is a highest frequency of a frequency range over which measured vertical velocity wavefields have a low signal-to-noise ratio.

15. A non-transitory computer-readable medium having machine-readable instructions encoded thereon for enabling one or more processors of a computer system to perform the operations of
 computing vertical velocity wavefields associated with marine seismic receivers for frequencies below a threshold frequency using pressure wavefields measured at the receivers and reflectivity of a time-varying rough free surface profile above the marine streamer;
 computing receiver deghosted wavefields based on the measured pressure wavefields, vertical velocity wavefields measured at the receivers above the threshold frequency, and the computed vertical velocity wavefields; and
 generating an image of the subterranean formation using at least in part the receiver deghosted wavefields, the image revealing structural information about the subterranean formation.

16. The medium of claim 15, wherein computing the vertical velocity wavefields further comprises:
 decomposing the measured wavefields into up-going and down-going wavefields;
 computing a free-surface profile image of the free-surface as a function of the up-going and down-going wavefields;
 computing a free-surface profile extension of the free-surface profile assuming a frozen free surface and using a spatial roughness spectrum of the free surface; and
 computing free-surface wavefield reflectivity for the free-surface profile and the free-surface profile extension.

17. The medium of claim 16, further comprising:
 computing a gradient of the pressure wavefield at receiver coordinate locations below the threshold frequency using the free-surface wavefield reflectivity; and
 computing the vertical velocity wavefield below the threshold frequency as a function of the gradient of the pressure wavefield at the receiver coordinate locations.

18. The medium of claim 15, wherein computing the receiver deghosted wavefields further comprises computing receiver deghosted pressure wavefields as a function of the measured vertical velocity wavefields and the computed vertical velocity wavefields below the threshold frequency, and computing receiver deghosted vertical velocity wavefields as a function of the deghosted pressure wavefields.

19. The medium of claim 15, wherein marine seismic receivers form a data acquisition surface.

20. The medium of claim 15, wherein the threshold frequency is a highest frequency of a frequency range over which measured vertical velocity wavefields have a low signal-to-noise ratio.

* * * * *